United States Patent
Yagi

(10) Patent No.: US 11,310,029 B2
(45) Date of Patent: Apr. 19, 2022

(54) COMMUNICATION APPARATUS, OPERATION PROCEDURE MANAGEMENT METHOD, AND COMPUTER READABLE MEDIUM

(71) Applicant: Mitsubishi Electric Corporation, Tokyo (JP)

(72) Inventor: Akiyoshi Yagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 273 days.

(21) Appl. No.: 16/627,604

(22) PCT Filed: Aug. 28, 2017

(86) PCT No.: PCT/JP2017/030680
§ 371 (c)(1),
(2) Date: Dec. 30, 2019

(87) PCT Pub. No.: WO2019/043750
PCT Pub. Date: Mar. 7, 2019

(65) Prior Publication Data
US 2020/0186327 A1 Jun. 11, 2020

(51) Int. Cl.
*G06F 21/00* (2013.01)
*H04L 9/06* (2006.01)
*H04L 9/32* (2006.01)

(52) U.S. Cl.
CPC ............ *H04L 9/0618* (2013.01); *H04L 9/32* (2013.01); *H04L 2209/12* (2013.01)

(58) Field of Classification Search
CPC ..... H04L 9/0618; H04L 9/32; H04L 2209/12; H04L 9/12; H04L 9/3271; G06F 21/44
See application file for complete search history.

(56) References Cited

U.S. PATENT DOCUMENTS 8,925,069 B2 * 12/2014 Louboutin ............ G06F 21/445
726/16
2003/0115389 A1 6/2003 Kagawa et al.
(Continued)

FOREIGN PATENT DOCUMENTS

EP 3890376 A1 * 10/2021
JP 2003-249934 A 9/2003
(Continued)

OTHER PUBLICATIONS

"Detailed implementation guideline for communication interface between HEMS and Smart meter (Route-B)", TR-1052, TTC Technical Report, The Telecommunication Technology Committee, Ver. 1.0, Mar. 17, 2014, pp. 1-42.
(Continued)

*Primary Examiner* — Kendall Dolly
(74) *Attorney, Agent, or Firm* — Birch, Stewart, Kolasch & Birch, LLP

(57) ABSTRACT

A second encrypted communication apparatus (300) operates as a PANA authentication client. If any of a plurality of events associated with PANA authentication occurs, a timer management unit (14) activates a timer among a plurality of timers that corresponds to the event that has occurred. When the timer activated by the timer management unit (14) expires, an authentication control unit (13) refers to management information which describes an operation procedure to be taken at timer expiration for each of the plurality of events and executes the operation procedure described in the management information regarding the event that has occurred.

9 Claims, 15 Drawing Sheets

(56) References Cited

U.S. PATENT DOCUMENTS

| | | | | |
|---|---|---|---|---|
| 2008/0227393 A1* | 9/2008 | Tang | ............... | H04W 12/50 455/41.3 |
| 2008/0311857 A1 | 12/2008 | Naoe et al. | | |
| 2012/0282898 A1 | 11/2012 | Lee et al. | | |
| 2013/0332542 A1* | 12/2013 | Foo | ............... | G06F 3/0647 709/206 |
| 2014/0365694 A1* | 12/2014 | Bolton | ............... | G06F 13/385 710/106 |
| 2016/0085960 A1* | 3/2016 | Priev | ............... | H04W 12/50 726/7 |
| 2017/0099152 A1* | 4/2017 | Kojima | ............... | H04L 9/3247 |
| 2019/0042758 A1* | 2/2019 | Francois | ............... | G06F 21/44 |
| 2021/0185088 A1* | 6/2021 | Lucidarme | ............... | H04L 63/0876 |
| 2021/0307085 A1* | 9/2021 | Pavlou | ............... | H04W 12/08 |

FOREIGN PATENT DOCUMENTS

| | | |
|---|---|---|
| JP | 2004-15725 A | 1/2004 |
| JP | 2005-65192 A | 3/2005 |
| JP | 2008-311969 A | 12/2008 |
| JP | 2012-39208 A | 2/2012 |
| JP | 2012-79231 A | 4/2012 |
| JP | 2012-94954 A | 5/2012 |
| JP | 2012-124687 A | 6/2012 |
| JP | 2012-530447 A | 11/2012 |
| WO | WO-2006073702 A1 * 7/2006 ............ G06F 21/44 |
| WO | WO-2008112497 A1 * 9/2008 ............ H04W 8/005 |
| WO | WO-2013184257 A1 * 12/2013 ............ G06F 3/061 |

OTHER PUBLICATIONS

Forsberg et al., "Protocol for Carrying Authentication for Network Access (PANA)", RFC5191, Network Working Group Request for Comments: 5191 Category: Standards Track, May 2008, pp. 1-46.
International Search Report issued in PCT/JP2017/030680 (PCT/ISA/210), dated Oct. 31, 2017.
Yasutake et al., "Implementation of AAA System for Network Access", Multimedia, Distributed, Cooperative, and Mobile Symposium, Information Processing Society of Japan, IPSJ Symposium Series, vol. 2008, No. 1, Jul. 2, 2008, pp. 1-13.

* cited by examiner

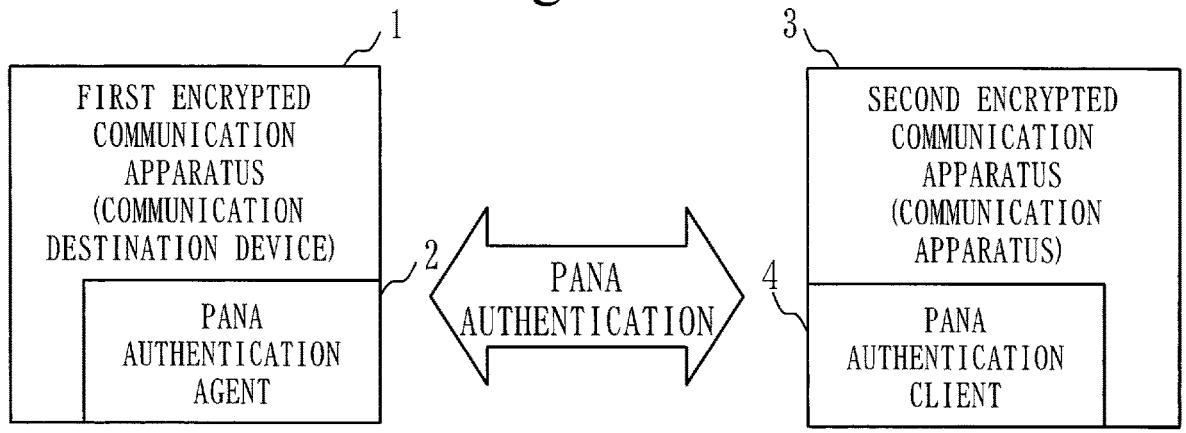
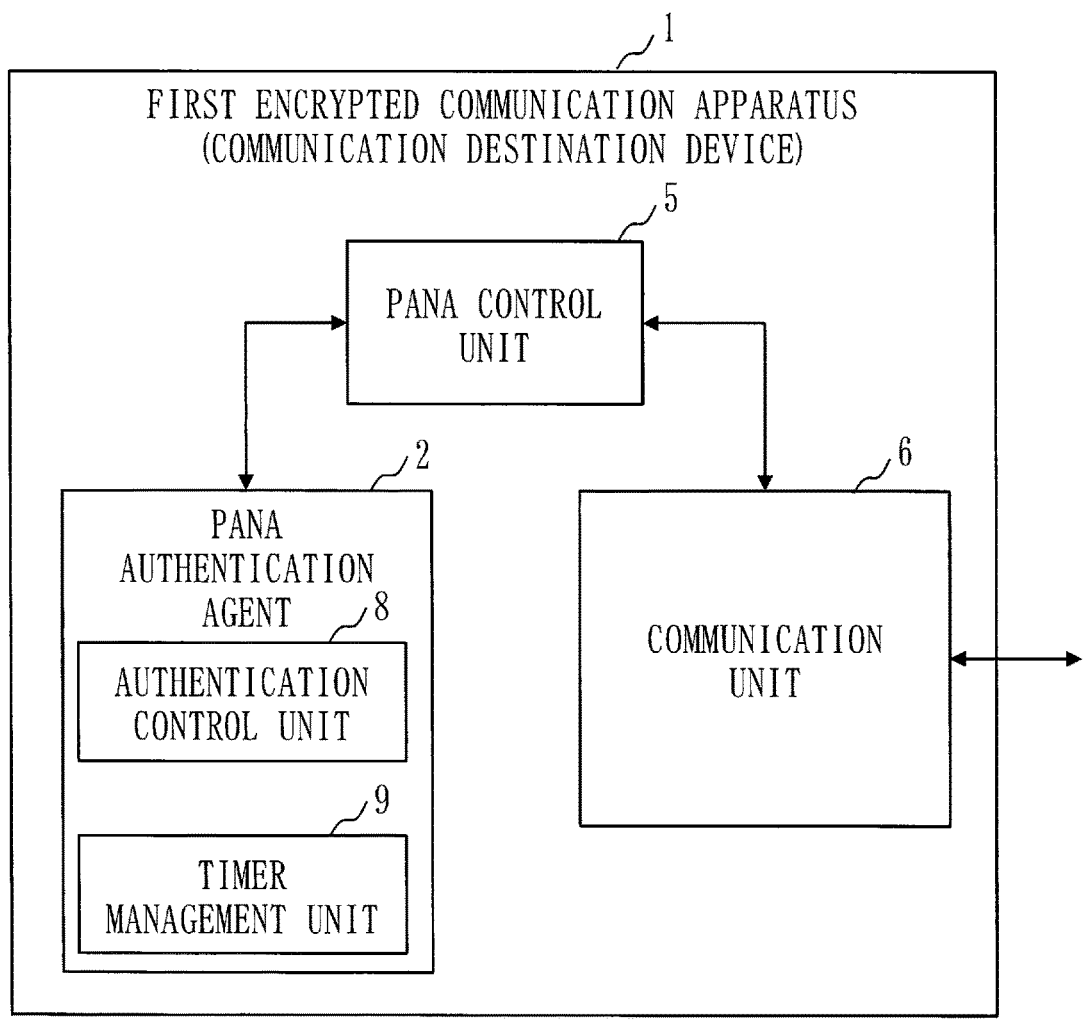

COMMUNICATION APPARATUS, OPERATION PROCEDURE MANAGEMENT METHOD, AND COMPUTER READABLE MEDIUM

TECHNICAL FIELD

The present invention relates to a communication apparatus, an operation procedure management method, and an operation procedure management program.

BACKGROUND ART

A PANA (Protocol for carrying Authentication for Network Access) authentication protocol is used for B-Route communication between a smart meter and a HEMS (Home Energy Management System) and HAN (Home Area Network) communication between the HEMS and a home electrical appliance. The PANA authentication protocol is a client-server type access authentication protocol to transfer an EAP (Extensible Authentication Protocol) message on a UDP/IP (User Datagram Protocol/Internet Protocol) between a PaC (PANA Client) and a PAA (PANA Authentication Agent) (Non-Patent Literature 1 and Non-Patent Literature 2).

Since the PANA authentication protocol operates on the UDP/IP, the PANA authentication protocol is an authentication protocol with high versatility that does not depend on a network or a communication medium.

CITATION LIST

Non-Patent Literature

Non-Patent Literature 1: RFC5191: Protocol for Carrying Authentication for Network Access (PANA) (http://tools.ietf.org/html/rfc5191)

Non-Patent Literature 2: Detailed Implementation Guideline for Communication Interface between HEMS and Smart Meter (B-Route), TR-1052, TTC Technical Report, Ver. 1.0, established on Mar. 17, 2014.

SUMMARY OF INVENTION

Technical Problem

A prior art (Non-Patent Literature 1) describes an operation procedure of a PANA authentication protocol to be taken at the time of normal operation, but not the operation procedure to be taken when an exception occurs in PANA authentication. For example, the prior art (Non-Patent Literature 1) does not describe the operation procedure to be taken when an exception, such as a PAA being restarted during an authentication sequence, occurs. The prior art (Non-Patent Literature 1) does not describe the operation procedure to be taken when an exception such as contention between a plurality of communication sequences occurs, neither.

If the PAA is restarted during the authentication sequence, a Pac will be deadlocked. If the plurality of communication sequences contends, processing of a part of the contending communication sequences will be delayed.

The main objective of the present invention is to acquire a configuration that enables an appropriate operation corresponding to an exception even if the exception occurs in the PANA authentication.

Solution to Problem

A communication apparatus according to the present invention is a communication apparatus operating as a PANA (Protocol for Carrying Authentication for Network Access) authentication client and includes:

a timer management unit, if any of a plurality of events associated with PANA authentication occurs, to activate a timer among a plurality of timers that corresponds to the event that has occurred; and an operation procedure execution unit, when the timer activated by the timer management unit expires, to refer to management information which describes an operation procedure to be taken at timer expiration for each of the plurality of events, and to execute the operation procedure described in the management information regarding the event that has occurred.

Advantageous Effects of Invention

The present invention enables an appropriate operation corresponding to an exception even if the exception occurs in the PANA authentication.

BRIEF DESCRIPTION OF DRAWINGS

FIG. 1 is a diagram illustrating an example of a configuration of a communication system according to Embodiment 1;

FIG. 2 is a diagram illustrating a functional configuration of a first encrypted communication apparatus according to Embodiment 1;

DESCRIPTION OF EMBODIMENTS

Embodiments of the present invention are explained using figures below. In the following description of the embodiments and drawings, components with the same reference signs mean the same or corresponding components.

Embodiment 1

*Description of Configuration*

FIG. 1 illustrates an example of a configuration of a communication system according to the present embodiment.

The communication system according to the present embodiment is composed of a first encrypted communication apparatus 1 and a second encrypted communication apparatus 3. The first encrypted communication apparatus 1 and the second encrypted communication apparatus 3 implement a communication sequence for PANA authentication (hereinafter referred to as a PANA authentication sequence).

A PANA authentication agent 2 is deployed in the first encrypted communication apparatus 1. In other words, the first encrypted communication apparatus 1 operates as a PANA authentication agent.

A PANA authentication client 4 is deployed in the second encrypted communication apparatus 3. In other words, the second encrypted communication apparatus 3 operates as a PANA authentication client.

The first encrypted communication apparatus 1 corresponds to a communication destination device. And, the second encrypted communication apparatus 3 corresponds to a communication device.

Operation implemented by the second encrypted communication apparatus 3 corresponds to an operation procedure management method.

Figure 16:
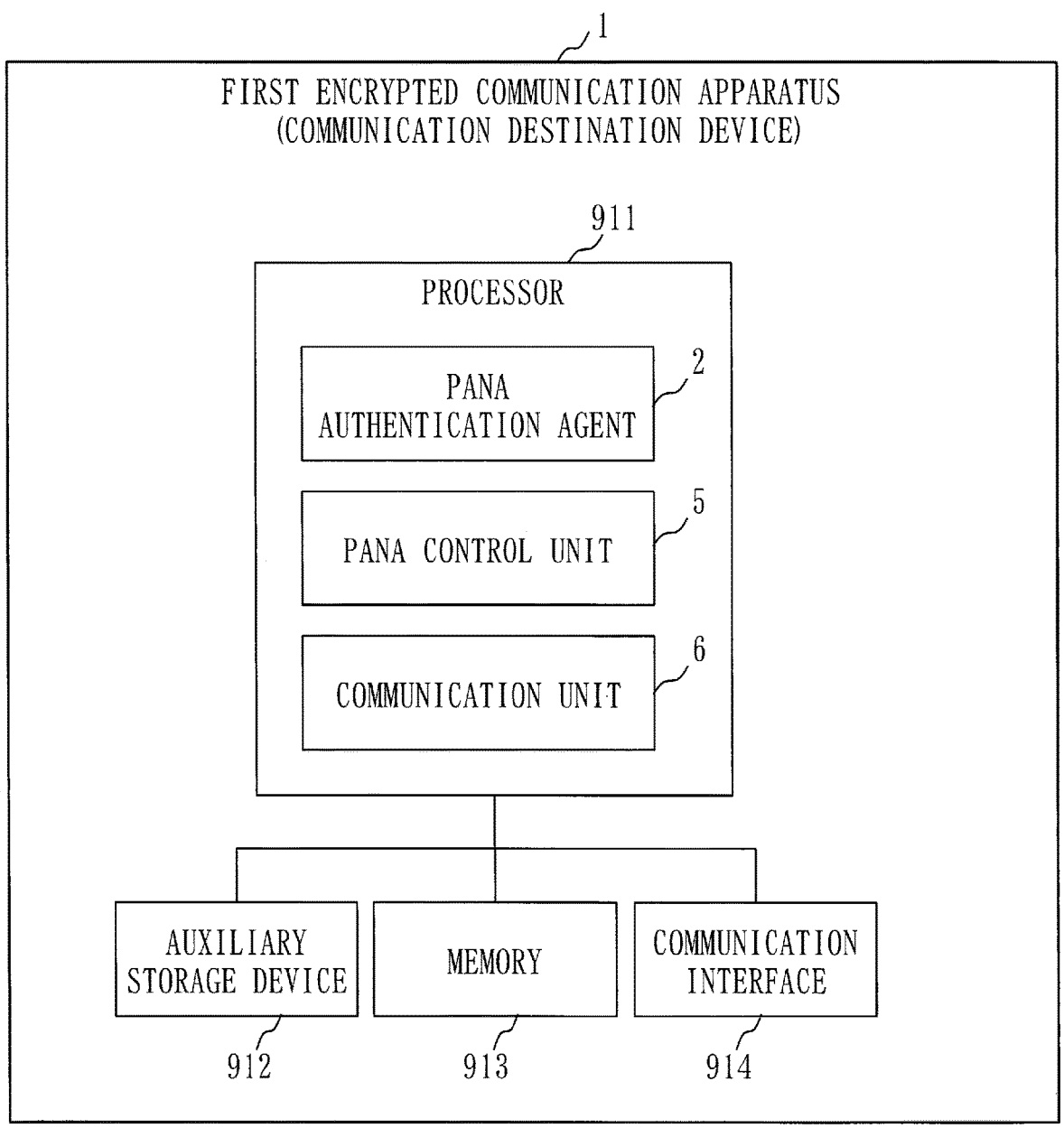
FIG. 16 is a diagram illustrating an example of a hardware configuration of the first encrypted communication apparatus according to Embodiments from 1 to 3.

FIG. 2 illustrates an example of a functional configuration of the first encrypted communication apparatus 1. FIG. 16 illustrates an example of a hardware configuration of the first encrypted communication apparatus 1.

The first encrypted communication apparatus 1 according to the present embodiment is a computer.

The first encrypted communication apparatus 1 includes a processor 911, an auxiliary storage device 912, a memory 913, and a communication interface 914 as hardware.

The first encrypted communication apparatus 1 also includes the PANA authentication agent 2, a PANA control unit 5, a communication unit 6 as a functional configuration. The PANA authentication agent 2 includes an authentication control unit 8 and a timer management unit 9 as an internal configuration. Details of the PANA authentication agent 2, the PANA control unit 5, the communication unit 6, the authentication control unit 8, and the timer management unit 9 will be described later.

In the auxiliary storage device 912, a program to realize functions of the PANA authentication agent 2 (the authentication control unit 8 and the timer management unit 9), the PANA control unit 5, and the communication unit 6 is stored.

The program is loaded into the memory 913. Then, the processor 911 reads out the program from the memory 913, executes the program read out, and performs operation of the PANA authentication agent 2 (the authentication control unit 8 and the timer management unit 9), the PANA control unit 5, and the communication unit 6, as described later.

FIG. 16 schematically illustrates a situation in which the processor 911 executes the program to realize the functions of the PANA authentication agent 2, PANA control unit 5, and the communication unit 6.

The communication interface 914 is an electronic circuit that receives and transmits data.

In FIG. 2, the PANA authentication agent 2 executes the PANA authentication sequence with the second encrypted communication apparatus 3.

The PANA control unit 5 instructs operation of the PANA authentication.

The communication unit 6 communicates with the second encrypted communication apparatus 3 using the communication interface 914.

In the PANA authentication agent 2, the authentication control unit 8 controls execution of the PANA authentication sequence.

The timer management unit 9 manages a timer.

Figure 3:
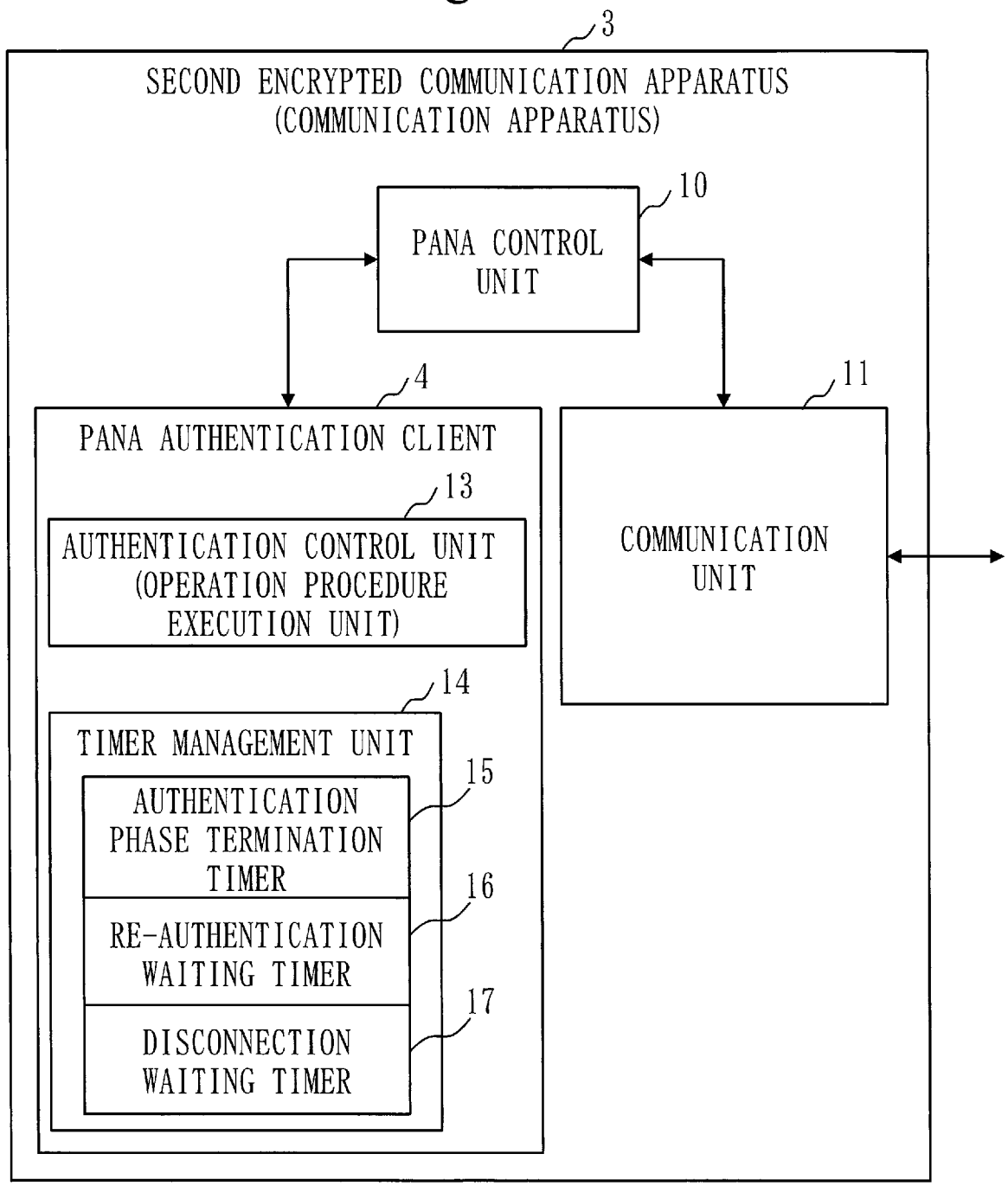
FIG. 3 is a diagram illustrating a functional configuration of a second encrypted communication apparatus according to Embodiment 1.
Figure 17:
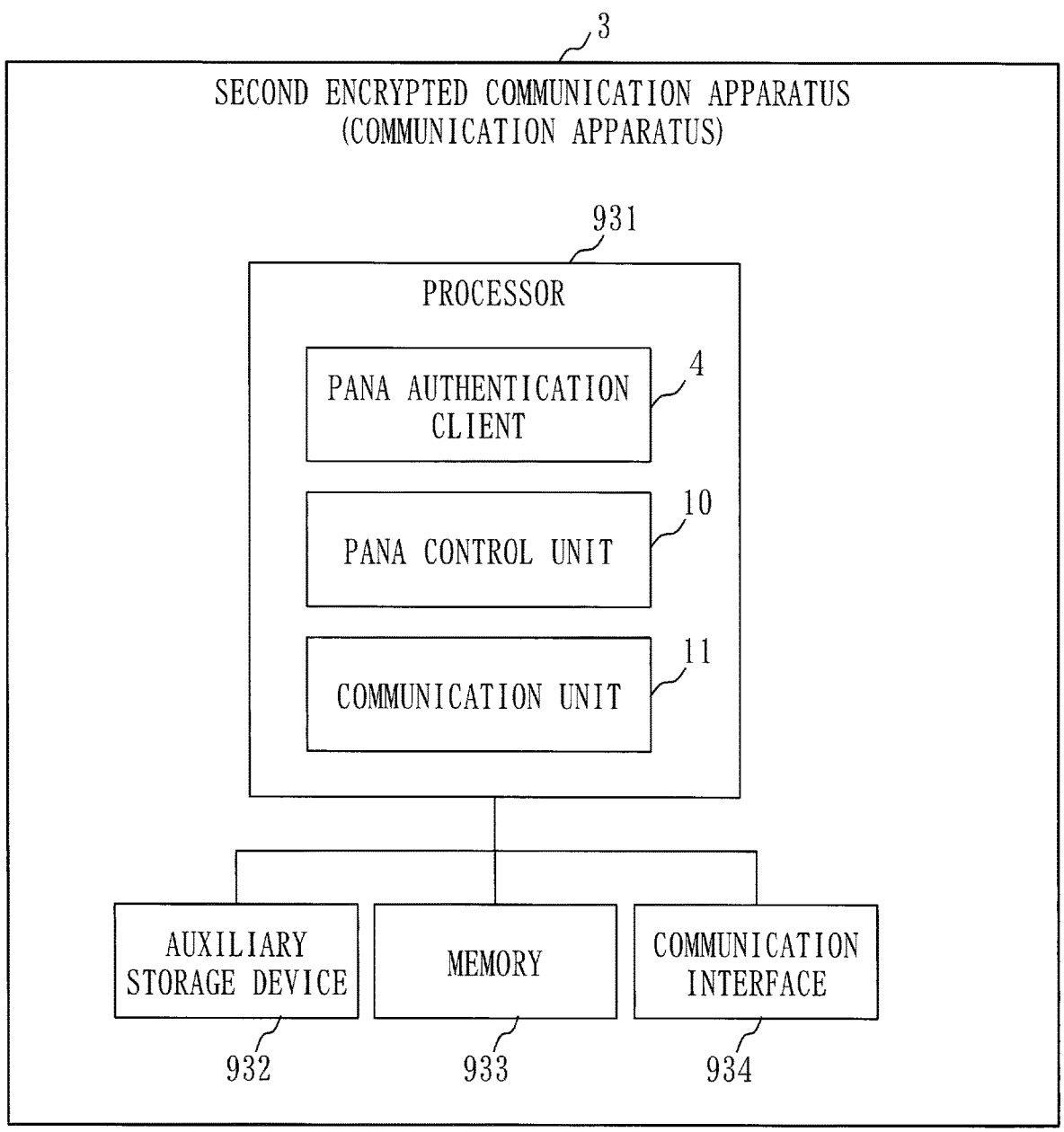
FIG. 17 is a diagram illustrating an example of the hardware configuration of the second encrypted communication apparatus according to Embodiments from 1 to 3.

FIG. 3 illustrates an example of a functional configuration of the second encrypted communication apparatus 3. FIG. 17 illustrates an example of a hardware configuration of the second encrypted communication apparatus 3.

The second encrypted communication apparatus 3 includes a processor 931, an auxiliary storage device 932, a memory 933, and a communication interface 934 as hardware.

The second encrypted communication apparatus 3 also includes the PANA authentication client 4, a PANA control unit 10, and a communication unit 11 as a functional configuration. The PANA authentication client 4 includes an authentication control unit 13, a timer management unit 14, an authentication phase termination timer 15, a re-authentication waiting timer 16, and a disconnection waiting timer 17 as an internal configuration. Details of the PANA authentication client 4, the PANA control unit 10, the communication unit 11, the authentication control unit 13, the timer management unit 14, the authentication phase termination timer 15, the re-authentication waiting timer 16, and the disconnection waiting timer 17 will be described later.

In the auxiliary storage device 932, a program to realize functions of the PANA authentication client 4 (the authentication control unit 13, the timer management unit 14, the authentication phase termination timer 15, the re-authentication waiting timer 16, and the disconnection waiting timer 17), the PANA control unit 10, and the communication unit 11 is stored.

The program is loaded into the memory 933. Then, the processor 931 reads out the program from the memory 933, executes the program read out, and performs operation of the PANA authentication client 4 (the authentication control unit 13, the timer management unit 14, the authentication phase termination timer 15, the re-authentication waiting timer 16, and the disconnection waiting timer 17), the PANA control unit 10, and the communication unit 11 as described below.

FIG. 17 schematically illustrates a situation in which the processor 931 executes the program to realize the functions of the PANA authentication client 4, the PANA control unit 10, and the communication unit 11.

The communication interface 934 is the electronic circuit that receives and transmits data.

The PANA authentication client 4 executes the PANA authentication sequence with the first encrypted communication apparatus 1.

The PANA control unit 10 instructs the operation of the PANA authentication.

The communication unit 11 communicates with the first encrypted communication apparatus 1 using the communication interface 934.

In the PANA authentication client 4, the authentication control unit 13 controls the execution of the PANA sequence.

Management information to be described later, describes a plurality of events that is associated with the PANA authentication. The management information also describes a timer that corresponds to the event for each event. The management information also describes an operation procedure to be taken at timer expiration for each event. At the timer expiration, the authentication control unit 13 executes the operation procedure described in the management information for the event that has occurred.

As to the present embodiment, it is assumed that the management information describes an event by which the PANA authentication sequence (hereinafter referred to as a PANA authentication initiation event) is to be initiated, as one of the plurality of events. The management information also describes that the authentication phase termination timer 15 is activated by occurrence of the PANA authentication initiation event. The management information also describes an operation procedure that information used for the PANA authentication sequence is discarded and a status of the second encrypted communication apparatus 3 is restored to an IDLE status, as an operation procedure to be taken when the authentication phase termination timer 15 expires. The management information is stored in, for example, the auxiliary storage device 932.

When the authentication phase termination timer 15 expires because the PANA authentication sequence with the first encrypted communication apparatus 1 fails to be completed properly, the authentication control unit 13 discards the information used for the PANA authentication sequence with the first encrypted communication apparatus 1, and restores the status of the second encrypted communication apparatus 3 to the IDLE status.

The authentication control unit 13 corresponds to an operation procedure execution unit. Operation implemented by the authentication control unit 13 corresponds to an operation procedure execution process.

The timer management unit 14 manages the authentication phase termination timer 15, the re-authentication waiting timer 16, and the disconnection waiting timer 17.

The timer management unit 14 refers to the management information, determines whether any of the plurality of events has occurred, and, if the timer management unit 14 determines that any of the plurality of events has occurred, activates any one of the authentication phase termination timer 15, the re-authentication waiting timer 16, and the disconnection waiting timer 17 depending on the exceptional event that has occurred.

As described above, as to the present embodiment, it is assumed that the management information describes the PANA authentication initiation event. In the present embodiment, the timer management unit 14 activates the authentication phase termination timer 15 according to the occurrence of the PANA authentication initiation event. An example that the timer management unit 14 activates the re-authentication waiting timer 16 will be explained in Embodiment 2. Details of the re-authentication waiting timer 16 will be explained in Embodiment 2. An example that the timer management unit 14 activates the disconnection waiting timer 17 will be explained in Embodiment 3. Details of the disconnection waiting timer 17 will be explained in Embodiment 3.

When the PANA authentication sequence is initiated between the first encrypted communication apparatus 1 and the second encrypted communication apparatus 3, the timer management unit 14 determines that the PANA authentication initiation event has occurred, and activates the authentication phase termination timer 15. If the PANA authentication sequence with the first encrypted communication apparatus 1 is completed properly before the authentication phase termination timer 15 expires, the timer management unit 14 stops the authentication phase termination timer 15. On the other hand, if the authentication phase termination timer 15 expires because the PANA authentication sequence with the first encrypted communication apparatus 1 fails to be completed properly, the authentication control unit 13 discards the information used for the PANA authentication sequence, and restores the status of the second encrypted communication apparatus 3 to the IDLE status, as described above.

\*\*\*Description of Operation\*\*\*

Before explaining an example of operation of the first encrypted communication apparatus 1 and the second encrypted communication apparatus 3 according to the present embodiment, a process procedure according to the prior art (Non-Patent Literature 1) to be taken at successful PANA authentication is explained.

Figure 4:
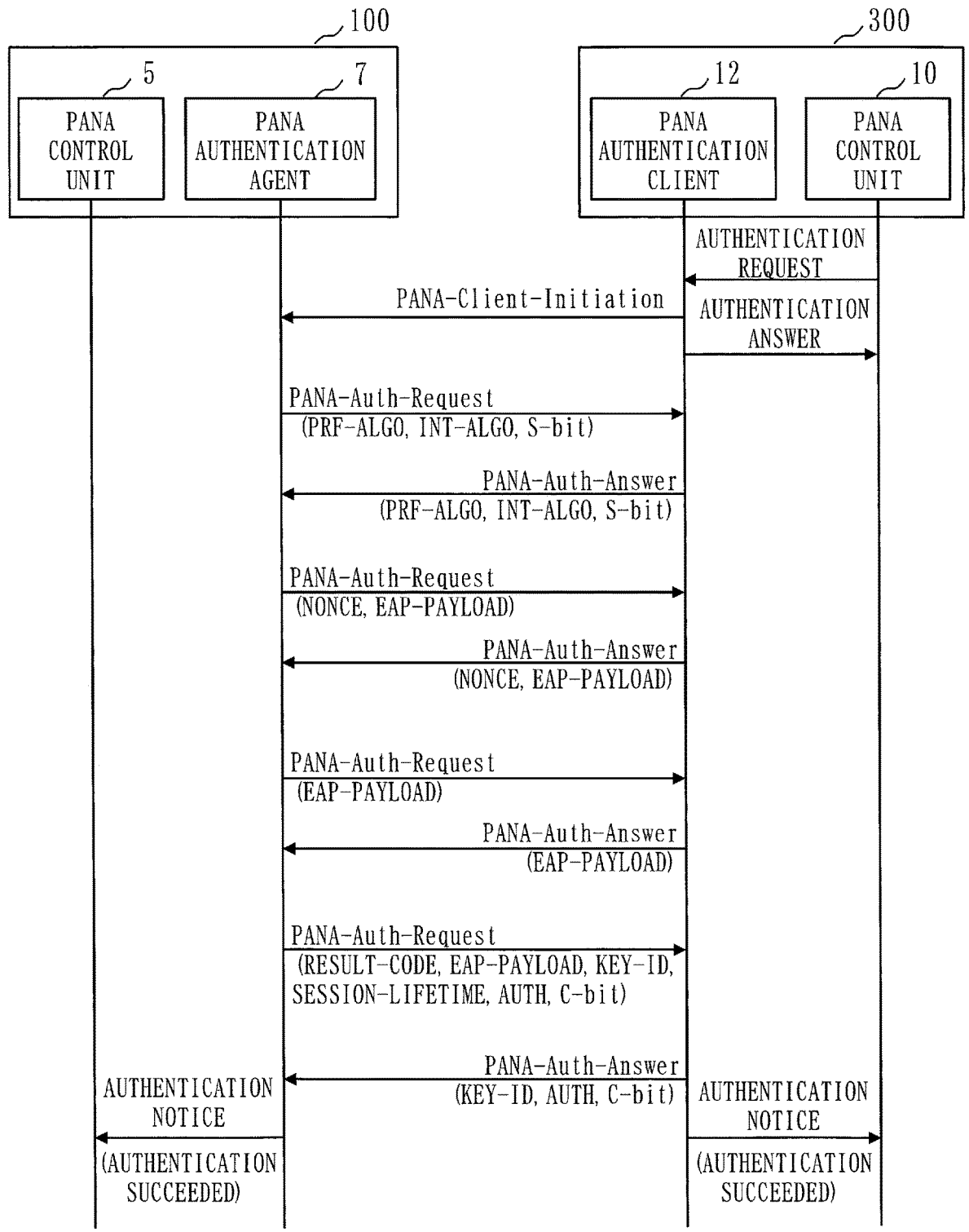
FIG. 4 is a diagram illustrating an example of a conventional process procedure to be taken when PANA authentication succeeds.

FIG. 4 illustrates the process procedure according to the prior art (Non-Patent Literature 1) to be taken at the successful PANA authentication. Since details of FIG. 4 are described in Non-Patent Literature 1, explanation of FIG. 4 is omitted.

In FIG. 4, a first encrypted communication apparatus 100 includes the PANA control unit 5 and a PANA authentication agent 7. The PANA control unit 5 of the first encrypted communication apparatus 100 has a same function as that of the PANA control unit 5 illustrated in FIG. 2. On the other hand, the PANA authentication agent 7 is different from the PANA authentication agent 2 of FIG. 2. In other words, the PANA authentication agent 7 does not include the authentication control unit 8 and the timer management unit 9, which is different from the PANA authentication agent 2 of FIG. 2. A second encrypted communication apparatus 300 includes the PANA control unit 10 and a PANA authentication client 12. The PANA control unit 10 of the second encrypted communication apparatus 300 has a same function as that of the PANA control unit 10 illustrated in FIG. 3. On the other hand, the PANA authentication client 12 is different from the PANA authentication client 4 of FIG. 3. In other words, the PANA authentication client 12 does not include the authentication control unit 13, the timer management unit 14, and the authentication phase termination timer 15, the re-authentication waiting timer 16 and the disconnection waiting timer 17, which is different from the PANA authentication client 4 of FIG. 3.

Figure 5:
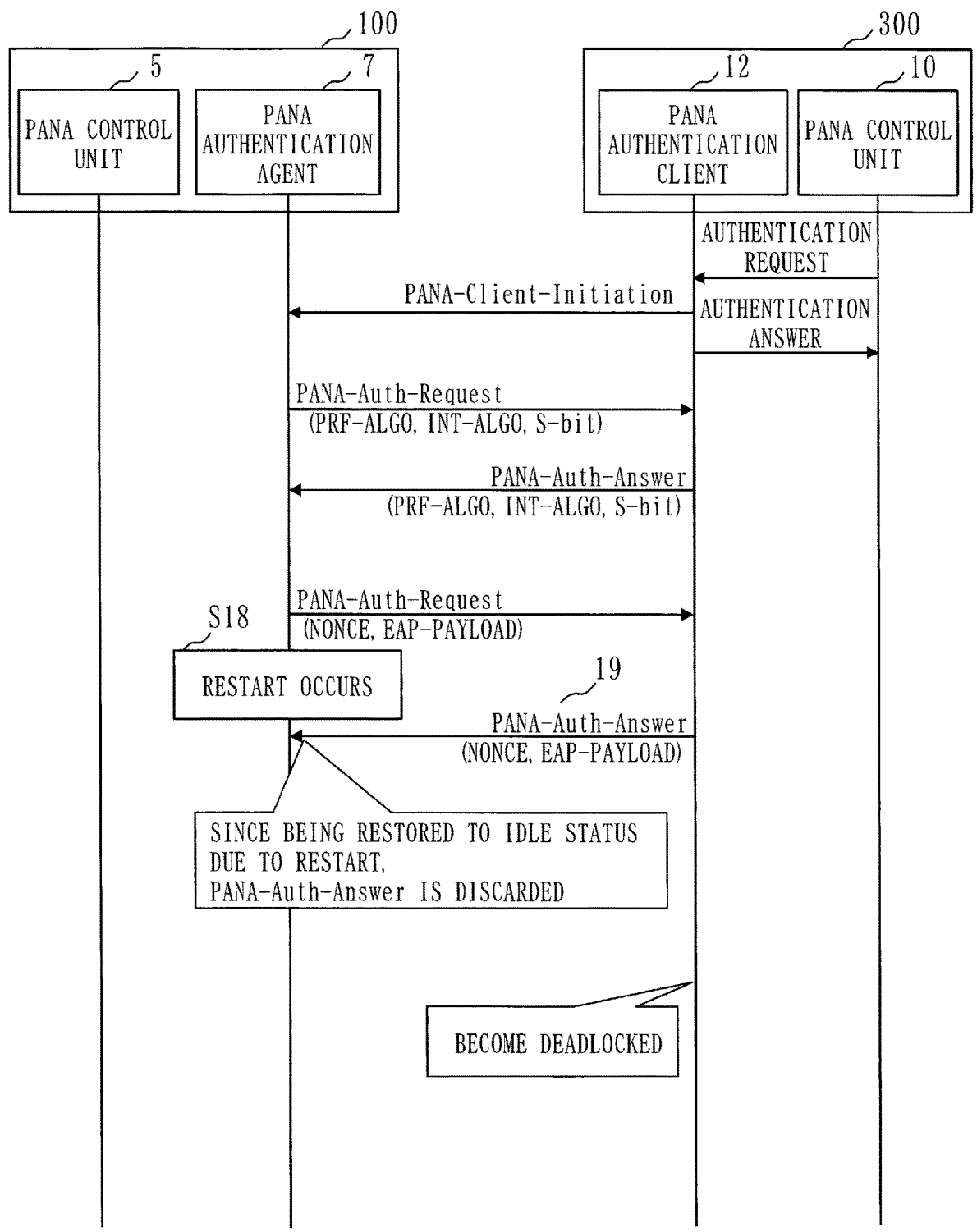
FIG. 5 is a diagram illustrating an example of a conventional process procedure to be taken when a PAA is restarted.

FIG. 5 illustrates an example of the process procedure according to the prior art (Non-Patent Literature 1) to be taken if the first encrypted communication apparatus 100 is restarted during the PANA authentication sequence.

Assume that a restart of the first encrypted communication apparatus 100 occurs in step S18 of FIG. 5. The first encrypted communication apparatus 100 has transmitted a PANA-Auth-Request to the second encrypted communication apparatus 300 right before step S18. However, since the status of the first encrypted communication apparatus 100 is restored to the IDLE status due to the restart, the first encrypted communication apparatus 100 determines that a message received is an unrequested message even if the first encrypted communication apparatus 100 receives from the second encrypted communication apparatus 300, a PANA-Auth-Answer 19 that is an answer to the PANA-Auth-Request. For this reason, the first encrypted communication apparatus 100 discards the PANA-Auth-Answer 19. Therefore, the second encrypted communication apparatus 300 is not able to proceed the PANA authentication sequence after that, and the second encrypted communication apparatus 300 becomes deadlocked.

As described above, since the prior art (Non-Patent Literature 1) only describes the operation procedure to be taken at the successful PANA authentication, Pac becomes deadlocked if the PAA is restarted.

Figure 6:
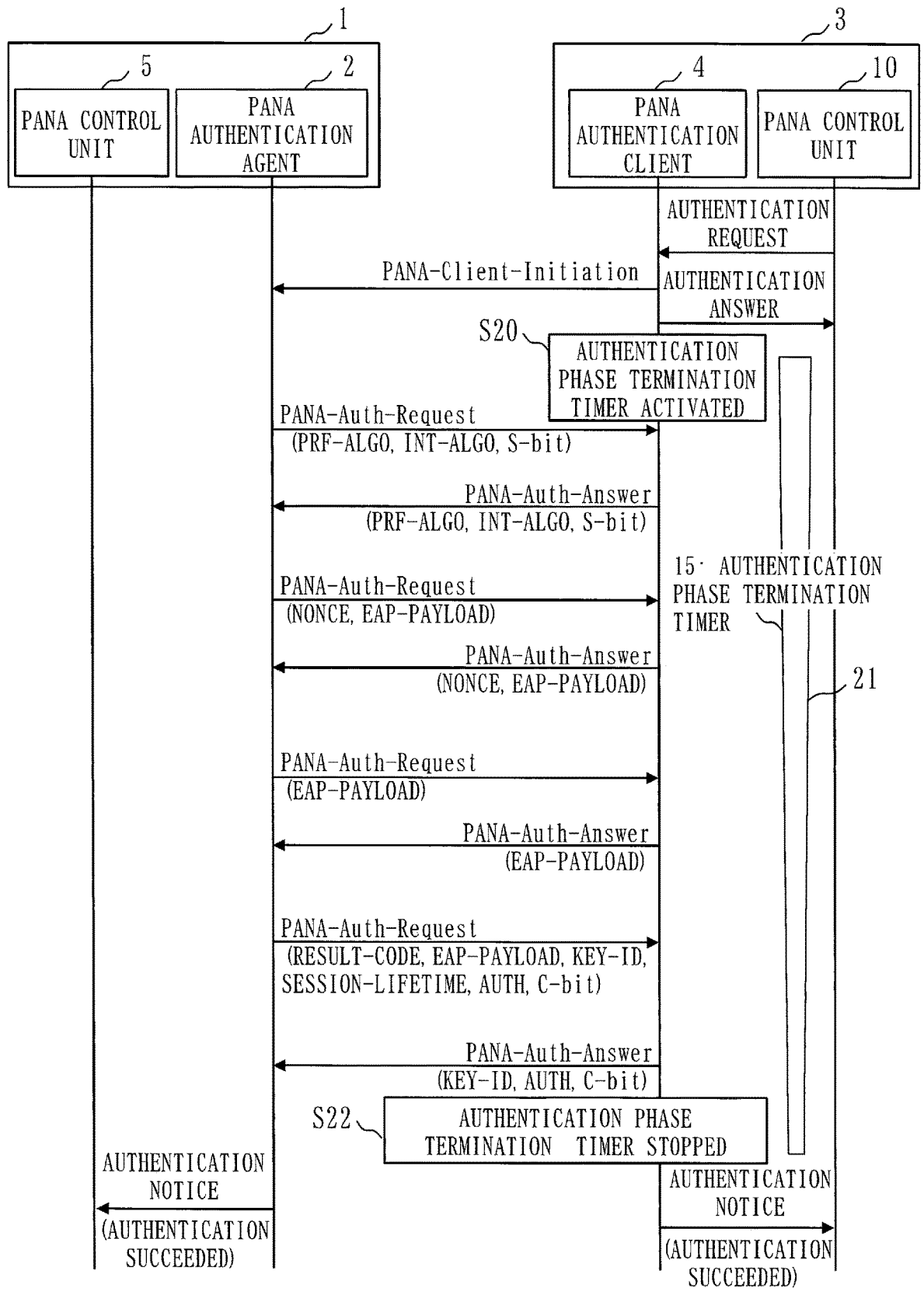
FIG. 6 is a diagram illustration an example of a process procedure according to Embodiment 1 to be taken when the PANA authentication succeeds.

FIG. 6 illustrates an example of the process procedure according to Embodiment 1 to be taken at the successful PANA authentication.

When the PANA authentication sequence is initiated, that is, when the PANA authentication initiation event occurs, the timer management unit 14 of the second encrypted communication apparatus 3 activates the authentication phase termination timer 15 (step S20).

A timer duration 21 represents a duration of time from activation to stop of the authentication phase termination timer 15. The timer management unit 14 stops the authentication phase termination timer 15 at a time when the PANA authentication sequence is properly terminated (step S22).

Figure 7:
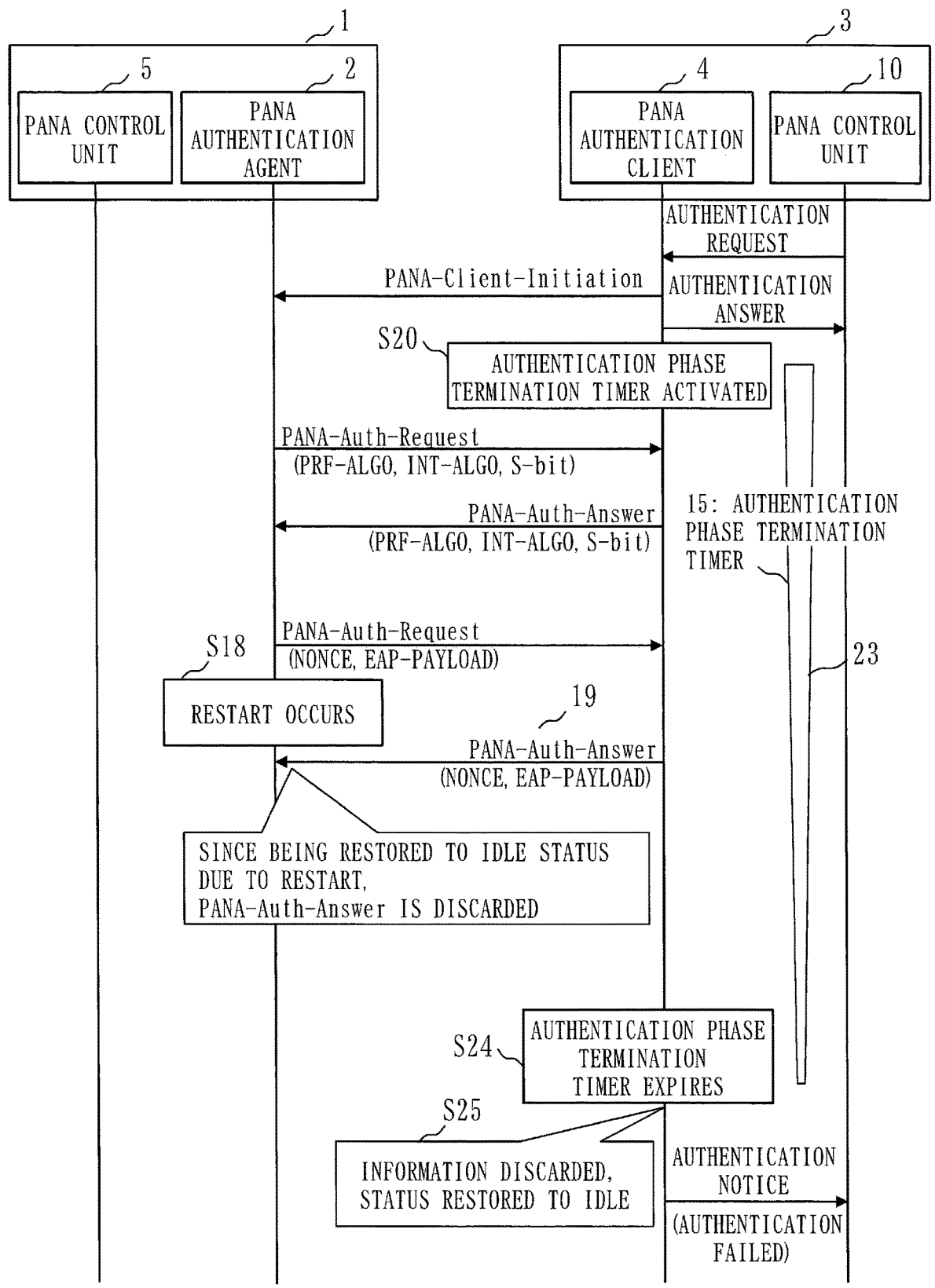
FIG. 7 is a diagram illustrating an example of a process procedure according to Embodiment 1 to be taken when the PAA is restarted.

FIG. 7 illustrates an example of the process procedure according to the present embodiment to be taken if the first encrypted communication apparatus 100 is restarted during the PANA authentication sequence.

In FIG. 7, as same as FIG. 6, when the PANA authentication sequence is initiated, that is, when the PANA authentication initiation event occurs, the timer management unit 14 of the second encrypted communication apparatus 3 activates the authentication phase termination timer 15 (step S20).

A timer duration 23 represents a duration of time from activation to expiration of the authentication phase termination timer 15.

As same as FIG. 5, assume that the restart of the first encrypted communication apparatus 1 occurs in step S18. The first encrypted communication apparatus 1 has transmitted the PANA-Auth-Request to the second encrypted communication apparatus 3 right before step S18. However, since the status of the first encrypted communication apparatus 1 is restored to the IDLE status due to the restart, the apparatus determines that the message received is the unrequested message even if the apparatus receives from the second encrypted communication apparatus 3, the PANA-Auth-Answer 19 that is the answer to the PANA-Auth-Request. For this reason, the first encrypted communication apparatus 1 discards the PANA-Auth-Answer 19. Therefore, the PANA authentication sequence is not completed, and the authentication phase termination timer 15 expires accordingly (step S24).

As a result of this, in the second encrypted communication apparatus 3, the authentication control unit 13 discards all information stored as the information to be used for the PANA authentication sequence (step S25). The authentication control unit 13 also restores the status of the second encrypted communication apparatus 3 to the IDLE status (step S25). This enables the PANA authentication sequence to be initiated once again.

Figure 13:
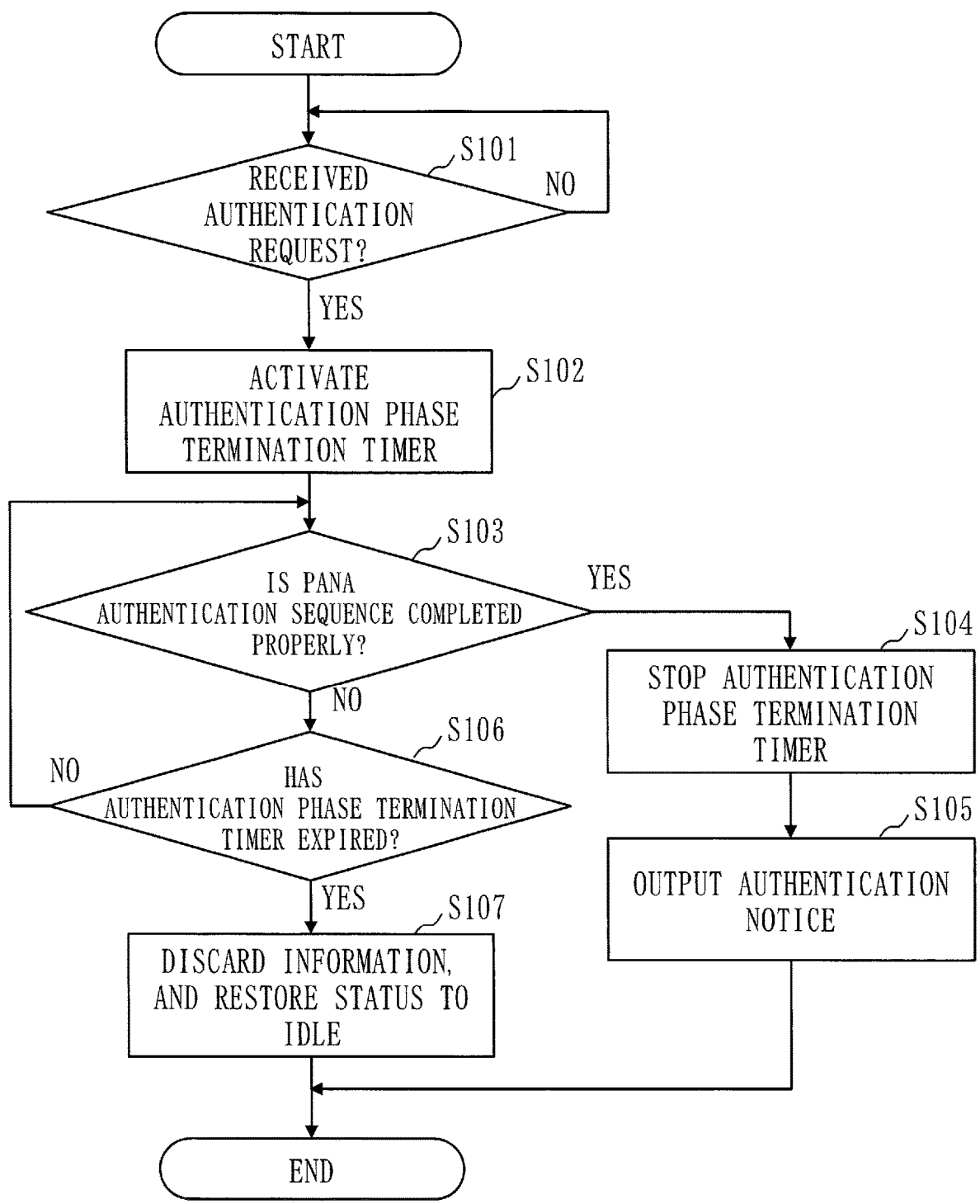
FIG. 13 is a flowchart illustrating an example of operation of the second encrypted communication apparatus according to Embodiment 1.

FIG. 13 illustrates an example of operation of the second encrypted communication apparatus 3 according to the present embodiment.

When the authentication control unit 13 receives an authentication request from the PANA control unit 10 (YES in step S101), the authentication control unit 13 notifies the timer management unit 14 of initiation of the PANA authentication sequence. The authentication control unit 13, in parallel, implements operation of and after PANA-Client-Initiation illustrated in FIG. 7.

Upon being notified of the initiation of the PANA authentication sequence from the authentication control unit 13, the timer management unit 14 determines that the PANA authentication initiation event has occurred, refers to the management information, and activates the authentication phase termination timer 15 corresponding to the occurrence of the PANA authentication initiation event (step S102).

Next, the authentication control unit 13 determines whether the PANA authentication sequence is completed properly (step S103).

If the PANA authentication sequence is completed properly (YES in step S103), the authentication control unit 13 notifies the timer management unit 14 of the completion of the PANA authentication sequence, and the timer management unit 14 stops the authentication phase termination timer 15 (step S104).

The authentication control unit 13 also outputs an authentication notice (authentication succeeded) to the PANA control unit 10 (step S105).

If the PANA authentication sequence fails to be completed properly (NO in step S103), the timer management unit 14 determines whether the authentication phase termination timer 15 has expired (step S106).

If the authentication phase termination timer 15 has not expired (NO in step S106), a process goes back to step S103.

If the authentication phase termination timer 15 has expired (YES in step S106), the timer management unit 14 notifies the authentication control unit 13 of the expiration of the authentication phase termination timer 15.

The authentication control unit 13 refers to the management information, and executes the operation procedure to be taken when the PANA authentication initiation event occurs and the authentication phase termination timer 15 expires. In specific, the authentication control unit 13 discards the information used in the PANA authentication phase, and restores the status of the second encrypted communication apparatus 3 to the IDLE status (step S107).

*Description of Advantageous Effects of Embodiment*

If the event occurs, the operation procedure described in the management information is executed in the second encrypted communication apparatus 3 according to the present embodiment. For this reason, according to the present embodiment, it is possible to efficiently proceed a process even if an exception occurs in the PANA authentication.

More specifically, according to the present embodiment, the operation procedure to be taken when the authentication phase termination timer 15 expires due to the occurrence of the PANA authentication initiation event is described in the management information. And, if the authentication phase termination timer 15 expires, the authentication control unit 13 discards the information used in the PANA authentication phase, and restores the status of the second encrypted communication apparatus 3 to the IDLE status. This enables a case in which the second encrypted communication apparatus 3 becomes deadlocked to be avoided.

Embodiment 2

In the present embodiment, a configuration that enables a process to be efficiently proceeded even if a sequence contention event occurs is explained. The sequence contention event is an event by which the second communication sequence is requested to be initiated before the first communication sequence is completed, the second communication sequence being different from the first communication sequence. More specifically, in the present embodiment, an example that the sequence contention event by which a PANA re-authentication sequence that is the second communication sequence is requested to be initiated before a PANA ping sequence that is the first communication sequence is completed is explained.

The PANA ping sequence is a ping communication sequence to maintain a PANA session. The PANA re-authentication sequence is the communication sequence for PANA re-authentication.

In the present embodiment, it is assumed that the timer management unit 14 manages a re-authentication timer even though an illustration is omitted.

In the present embodiment, mainly, a difference from Embodiment 1 is explained.

Matters not explained in the present embodiment are same as those in Embodiment 1.

According to the present embodiment, the management information describes the sequence contention event as the event. In other words, according to the present embodiment, the management information describes the sequence contention event by which the PANA re-authentication sequence is requested to be initiated before the PANA ping sequence is completed. According to the present embodiment, the management information further describes, as the operation procedure to be taken when the timer activated by the occurrence of the sequence contention event expires, the operation procedure that the PANA re-authentication sequence is initiated if the PANA ping sequence is completed at the timer expiration.

According to the present embodiment, if the contention between the PANA ping sequence and the PANA re-authentication sequence occurs, the timer management unit 14 activates the re-authentication waiting timer 16.

According to the present embodiment, if the PANA ping sequence is completed at the expiration of the re-authentication waiting timer 16, the authentication control unit 13 further initiates the PANA re-authentication sequence in accordance with the operation procedure described in the management information.

Figure 8:
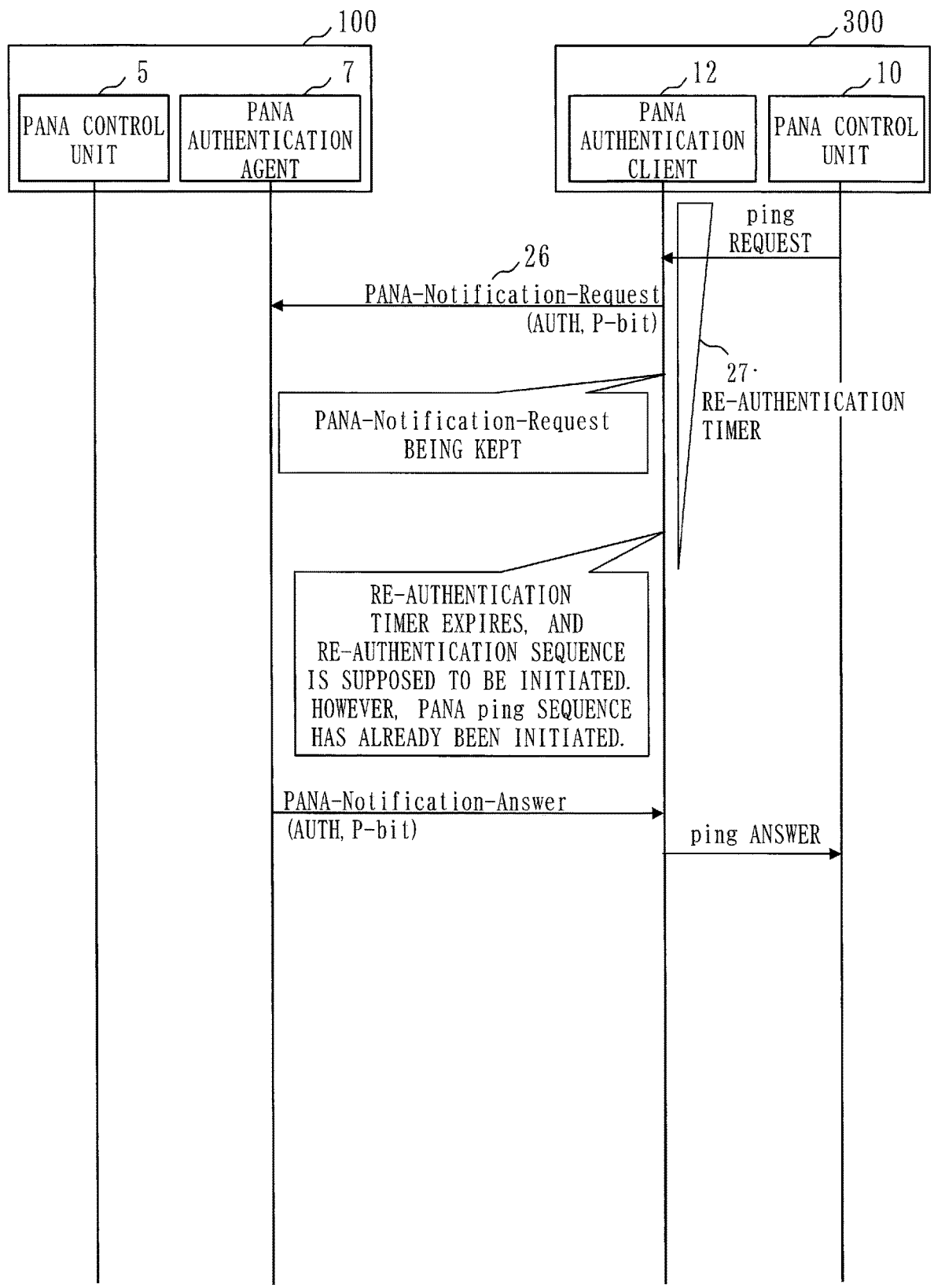
FIG. 8 is a diagram illustrating an example of a conventional process procedure to be taken when a sequence contention occurs.

FIG. 8 illustrates an example of the process procedure according to the prior art (Non-Patent Literature 1) to be taken if the PANA ping sequence and the PANA re-authentication sequence contend with each other.

According to the prior art (Non-Patent Literature 1), a re-authentication process needs to be implemented by the PANA authentication client for every certain period of time after the PANA authentication sequence succeeds. It is also stipulated in "5.2. Sequence Number and Retransmission A peer can only have one outstanding request at a time." of the prior art (Non-Patent Literature 1) that the PANA authentication client keeps only one last request message transmitted in order to retransmit the message or check a sequence number of the message.

In FIG. 8, the PANA ping sequence is initiated based on a ping request from the PANA control unit 10 in the second encrypted communication apparatus 300. The PANA authentication client 12 transmits a PANA-Notification-Request 26 for the ping upon the PANA ping sequence being initiated.

The PANA authentication client 12 is not able to transmit any other request message before receiving an answer from the first encrypted communication apparatus 100 under the "5.2. Sequence Number and Retransmission A peer can only have one outstanding request at a time". For this reason, if a re-authentication timer 27 expires before receiving a PANA-Notification-Answer from the first encrypted communication apparatus 100, the PANA authentication client 12 is not able to transmit the request message for the PANA re-authentication sequence to the first encrypted communication apparatus 100. Therefore, according to the prior art (Non-Patent Literature 1), the second encrypted communication apparatus 300 needs to implement an initiation process of the PANA re-authentication sequence once again after the PANA ping sequence is completed.

Figure 9:
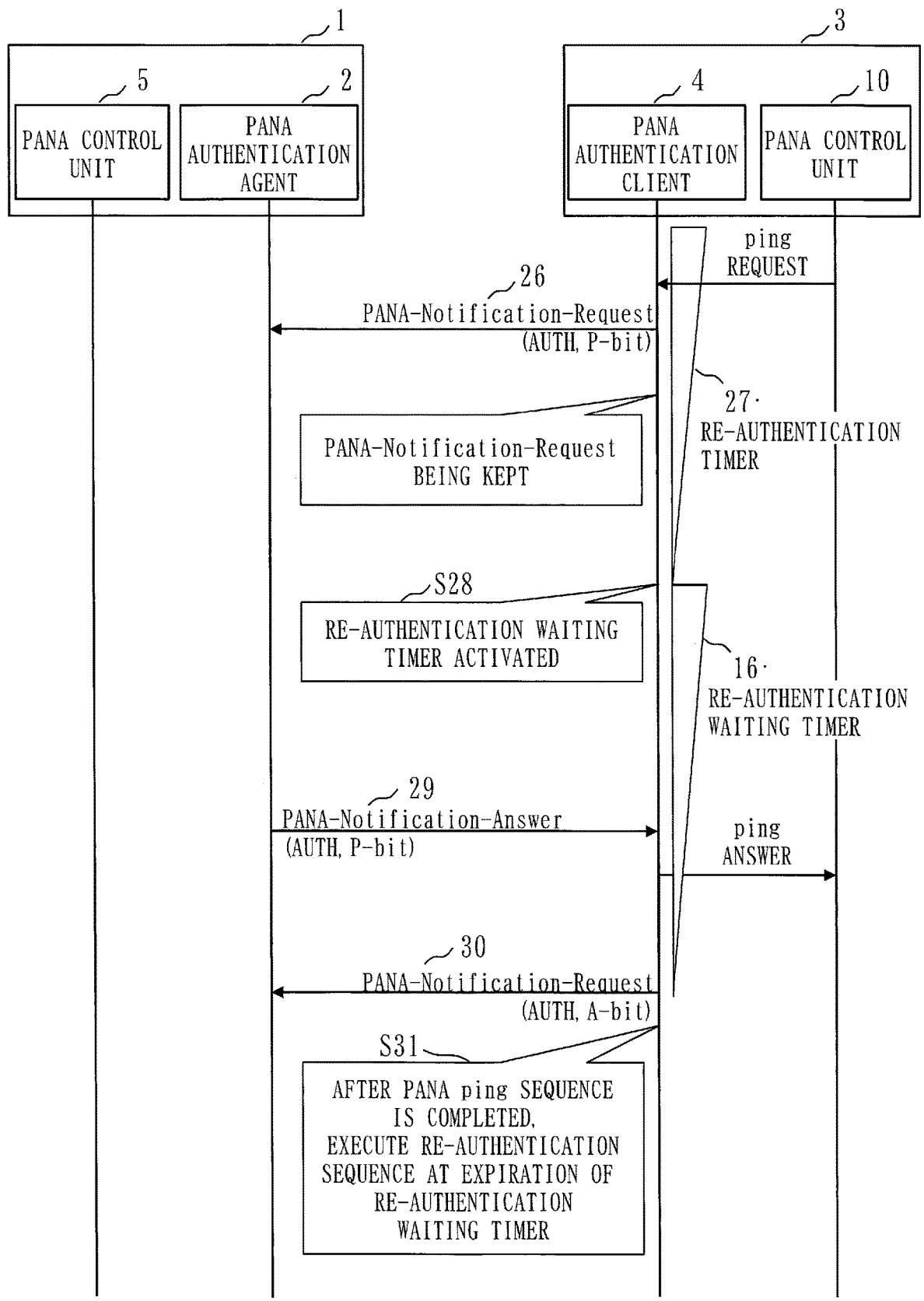
FIG. 9 is a diagram illustrating an example of a process procedure according to Embodiment 2 to be taken when the sequence contention occurs.

FIG. 9 illustrates an example of the process procedure according to the present embodiment to be taken when the event (the contention of the PANA ping with the re-authentication) occurs. In specific, FIG. 9 illustrates an example of the process procedure to be taken when the contention between the PANA ping sequence and the re-authentication sequence occurs.

As same as FIG. 8, the PANA ping sequence is initiated based on the ping request from the PANA control unit 10 in the second encrypted communication apparatus 3. The authentication control unit 13 of the PANA authentication client 4 transmits the PANA-Notification-Request 26 for the ping upon the initiation of the PANA ping sequence. If the re-authentication timer 27 expires before the PANA ping sequence is completed (before receiving a PANA-Notification-Answer 29 from the first encrypted communication apparatus 1), the timer management unit 14 activates the re-authentication waiting timer 16 in step S28.

A timer value of the re-authentication waiting timer 16 is a duration of time that is long enough to receive the PANA-Notification-Answer 29 from the first encrypted communication apparatus 1. Thus, it is possible to receive the PANA-Notification-Answer 29 from the first encrypted communication apparatus 1 during a period of time before the expiration of the re-authentication waiting timer 16.

Then, at the expiration of the re-authentication waiting timer 16, the authentication control unit 13 transmits a PANA-Notification-Request 30 for the re-authentication sequence (step S31).

As described above, the second encrypted communication apparatus 3 according to the present embodiment enables the re-authentication sequence to be initiated at the expiration of the re-authentication waiting timer 16 even if the contention between the PANA ping sequence and the re-authentication sequence occurs.

Figure 14:
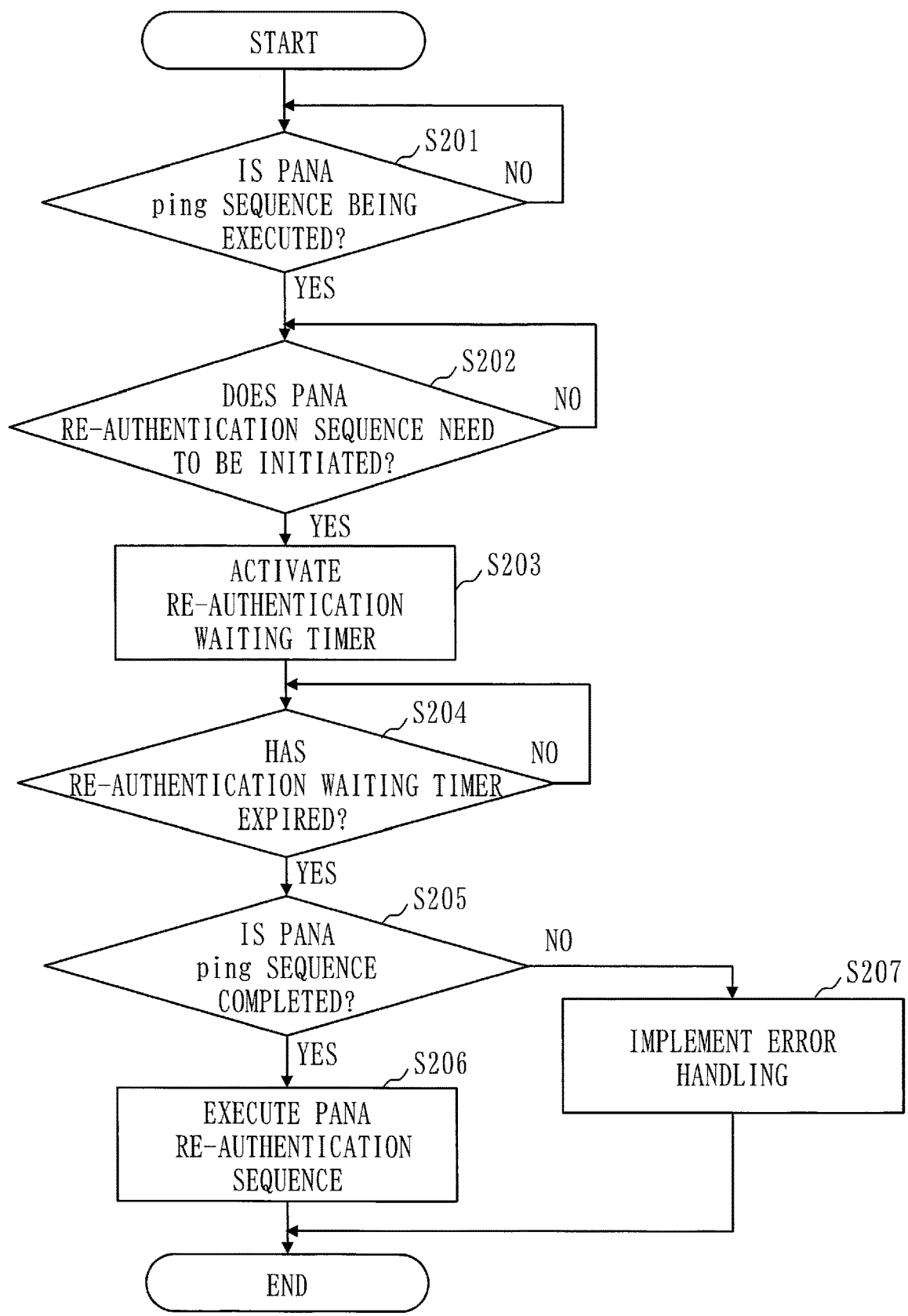
FIG. 14 is a flowchart illustrating an example of the operation of the second encrypted communication apparatus according to Embodiment 2.

FIG. 14 illustrates an example of the operation of the second encrypted communication apparatus 3 according to the present embodiment.

The timer management unit 14 determines whether the PANA ping sequence is currently being executed (step S201). In specific, if the timer management unit 14 is notified by the authentication control unit 13 of the PANA-Notification-Request 26 for the ping having been transmitted, the timer management unit 14 determines that the PANA ping sequence is currently being executed.

If the PANA ping sequence is currently being executed (YES in step S201), the timer management unit 14 determines whether the PANA re-authentication sequence needs to be initiated. In specific, the timer management unit 14 determines whether the re-authentication timer 27 has expired. If the timer management unit 14 determines that the PANA re-authentication sequence needs to be initiated, the timer management unit 14 determines that the sequence contention event between the PANA ping sequence and the PANA re-authentication sequence has occurred.

If the timer management unit 14 determines that the sequence contention event between the PANA ping sequence and the PANA re-authentication sequence has occurred, the timer management unit 14 activates the re-authentication waiting timer 16 (step S203).

Next, the timer management unit 14 determines whether the re-authentication waiting timer 16 has expired (step S204).

If the re-authentication waiting timer 16 has expired (YES in step S204), the timer management unit 14 determines whether the PANA ping sequence is completed (step S205).

If the timer management unit 14 is notified by the authentication control unit 13 of the PANA-Notification-Answer 29 having been received from the first encrypted communication apparatus 1, the timer management unit 14 determines that the PANA ping sequence is completed. If the timer management unit 14 determines that the PANA ping sequence is completed before the expiration of the re-authentication waiting timer 16 (YES in step S205), the timer management unit 14 notifies the authentication control unit 13 that the PANA re-authentication sequence may be initiated.

If the authentication control unit 13 is notified by the timer management unit 14 that the PANA re-authentication sequence may be initiated, the authentication control unit 13 executes the PANA re-authentication sequence (step S206). In specific, the authentication control unit 13 transmits the PANA-Notification-Request 30 for the PANA re-authentication sequence.

On the other hand, if the timer management unit 14 determines that the PANA ping sequence is not completed before the expiration of the re-authentication waiting timer 16 (NO in step S205), the timer management unit 14 notifies the authentication control unit 13 of the expiration of the re-authentication waiting timer 16.

The authentication control unit 13 implements a prescribed error handling based on the notice from the timer management unit 14 (step S207).

According to the present embodiment, it is possible to efficiently proceed a process even if the event of the contention between the PANA ping sequence and the PANA re-authentication sequence occurs.

Embodiment 3

Also in the present embodiment, the configuration that enables the process to be efficiently proceeded even if the sequence contention event occurs is explained. More specifically, in the present embodiment, an example that the sequence contention event by which a PANA disconnection sequence that is the second communication sequence is requested to be initiated before the PANA ping sequence that is the first communication sequence is completed is explained.

The PANA ping sequence is, as explained in Embodiment 2, the ping communication sequence to maintain the PANA session. The PANA disconnection sequence is the communication sequence to disconnect the PANA session.

In the present embodiment, mainly, a difference from Embodiment 1 is explained.

Matters not explained in the present embodiment are same as those in Embodiment 1.

According to the present embodiment, the management information describes the sequence contention event as the event. In other words, according to the present embodiment, the management information describes the sequence contention event by which the PANA disconnection sequence is requested to be initiated before the PANA ping sequence is completed. According to the present embodiment, the management information further describes, as the operation procedure to be taken when the timer activated by the occurrence of the sequence contention event expires, the operation procedure that the PANA disconnection sequence is initiated if the PANA ping sequence is completed at the timer expiration.

According to the present embodiment, if the contention between the PANA ping sequence and the PANA disconnection sequence occurs, the timer management unit 14 activates the disconnection waiting timer 17.

According to the present embodiment, if the PANA ping sequence is completed at the expiration of the disconnection waiting timer 17, the authentication control unit 13 further initiates the PANA disconnection sequence in accordance with the operation procedure described in the management information.

Figure 10:
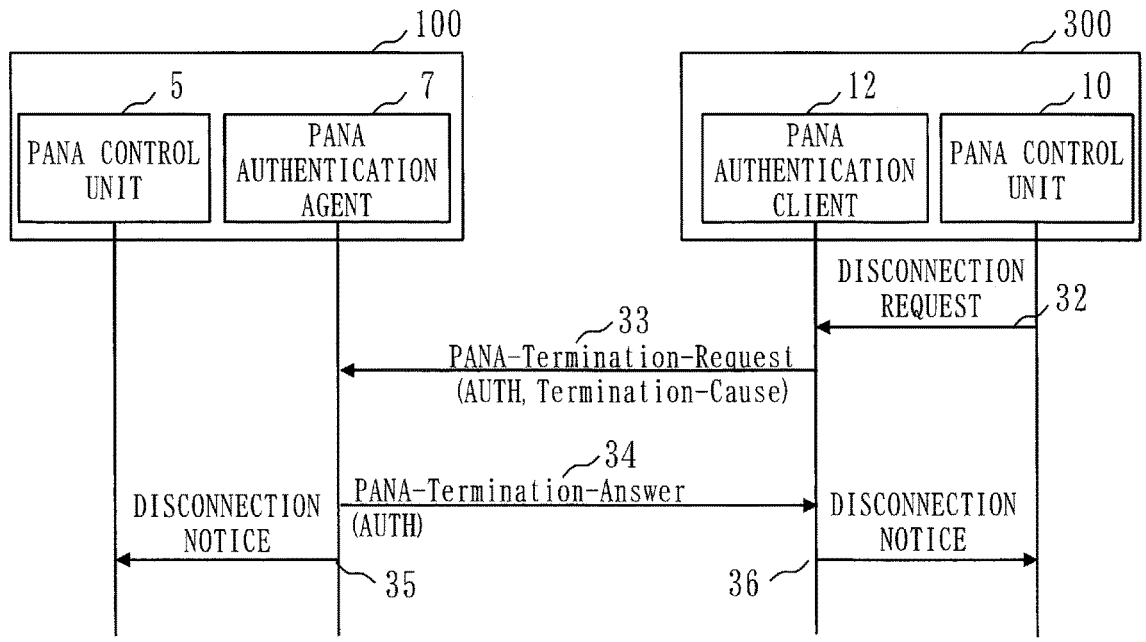
FIG. 10 is a diagram illustrating an example of a conventional process procedure to be taken when PANA disconnection succeeds.

FIG. 10 illustrates an example of the process procedure in the PANA disconnection sequence of the prior art (Non-Patent Literature 1).

In the second encrypted communication apparatus 300, the PANA authentication client 12 transmits a PANA-Termination-Request 33 upon receiving a disconnection request 32 from the PANA control unit 10.

In the first encrypted communication apparatus 100, the PANA authentication agent 7 transmits a PANA-Termination-Answer 34 to the second encrypted communication apparatus 300.

In the first encrypted communication apparatus 100, upon transmitting the PANA-Termination-Answer 34, the PANA authentication agent 7 outputs a disconnection notice 35 to the PANA control unit 5 to complete disconnection of the PANA session. And, in the second encrypted communication apparatus 300, the disconnection of the PANA session is completed by the PANA authentication client 12 receiving the PANA-Termination-Answer 34 and outputting a disconnection notice 36 to the PANA control unit 10.

Figure 11:
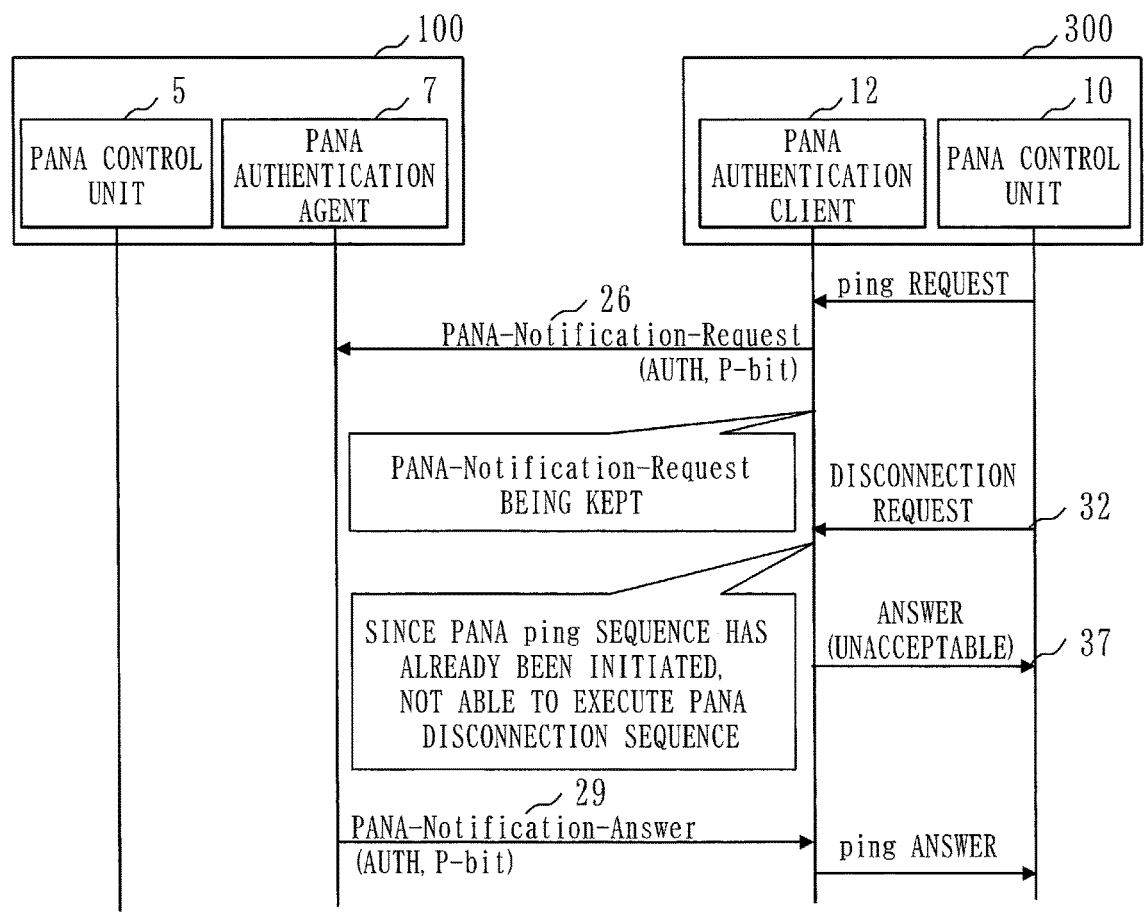
FIG. 11 is a diagram illustrating an example of a conventional process procedure to be taken when the sequence contention occurs.

FIG. 11 illustrates an example of the process procedure according to the prior art (Non-Patent Literature 1) to be taken when the contention between the PANA ping sequence and the PANA disconnection sequence occurs.

Also in FIG. 11, as same as FIG. 8, the PANA ping sequence is initiated based on the ping request from the PANA control unit 10 in the second encrypted communication apparatus 300. The PANA authentication client 12 transmits the PANA-Notification-Request 26 for the ping upon the initiation of the PANA ping sequence.

According to the prior art (Non-Patent Literature 1), it is not able to disconnect the PANA session until the PANA ping sequence is completed. For this reason, even if the disconnection request 32 is done by the PANA control unit 10 before receiving the PANA-Notification-Answer 29 from the first encrypted communication apparatus 100, the PANA authentication client 12 is not able to accept the disconnection request 32 and replies with an answer 37 of unacceptable to the PANA control unit 10.

Therefore, according to the prior art (Non-Patent Literature 1), the second encrypted communication apparatus 300 needs to implement an initiation process of the PANA disconnection sequence once again after the PANA ping sequence is completed.

Figure 12:
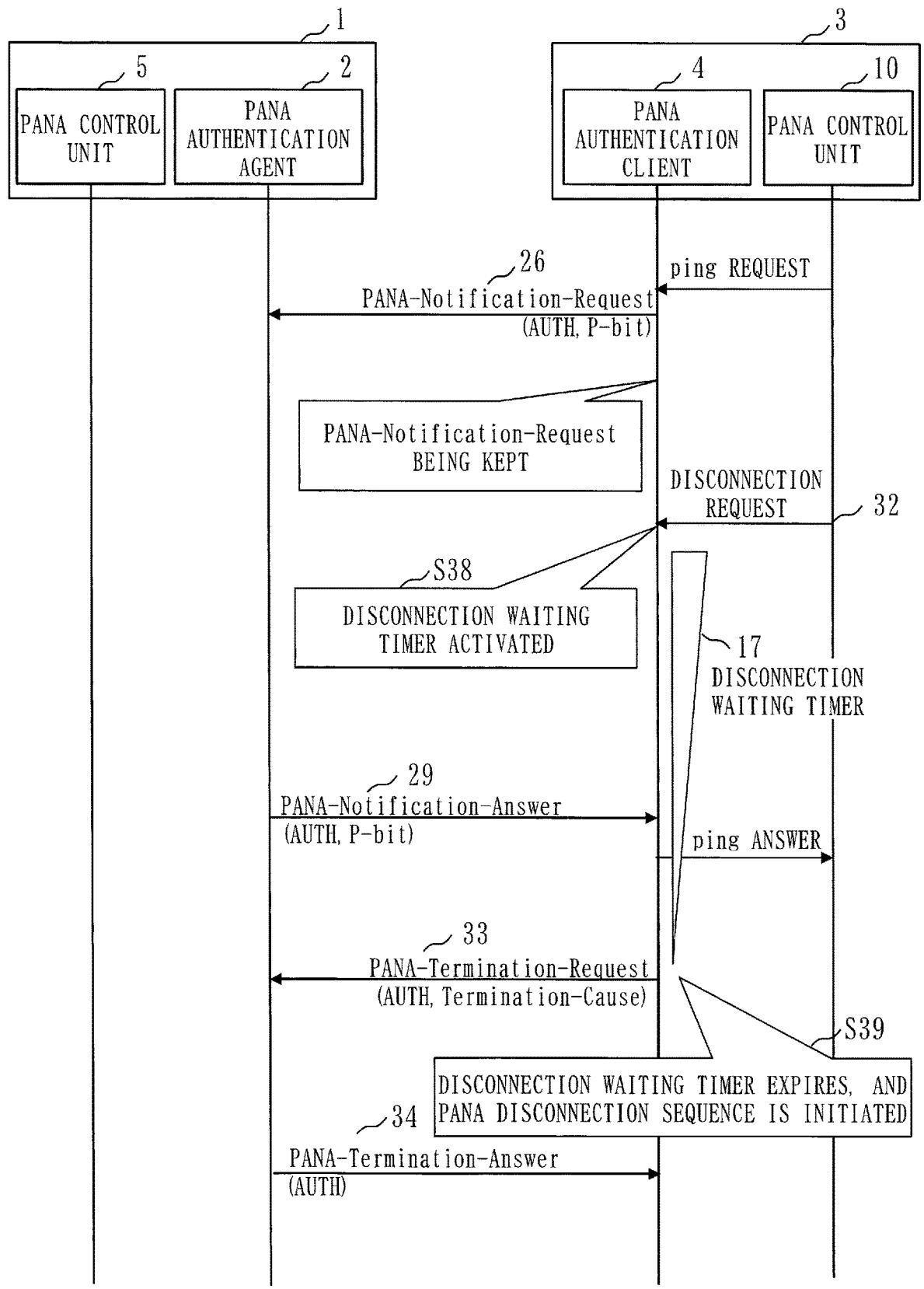
FIG. 12 is a diagram illustrating an example of the process procedure according to Embodiment 3 to be taken when the sequence contention occurs.

FIG. 12 illustrates an example of the process procedure according to the present embodiment to be taken when the contention between the PANA ping sequence and the PANA disconnection sequence occurs.

As same as FIG. 11, the PANA ping sequence is initiated based on the ping request from the PANA control unit 10 in the second encrypted communication apparatus 3. The authentication control unit 13 of the PANA authentication client 4 transmits the PANA-Notification-Request 26 for the ping upon the initiation of the PANA ping sequence. If the disconnection request 32 is received from the PANA control unit 10 before the PANA ping sequence is completed (before receiving the PANA-Notification-Answer 29 from the first encrypted communication apparatus 1), the timer management unit 14 activates the disconnection waiting timer 17 in step S38.

A timer value of the disconnection waiting timer 17 is a duration of time that is long enough to receive the PANA-Notification-Answer 29 from the first encrypted communication apparatus 1. Thus, it is possible to receive the PANA-Notification-Answer 29 from the first encrypted communication apparatus 1 during a period of time before the expiration of the disconnection waiting timer 17. Then, at the expiration of the disconnection waiting timer 17, the authentication control unit 13 transmits the PANA-Termination-Request 33 for the PANA disconnection sequence (step S39).

As described above, the second encrypted communication apparatus 3 according to the present embodiment enables the PANA disconnection sequence to be initiated after the expiration of the disconnection waiting timer 17 even if the contention between the PANA ping sequence and the PANA disconnection sequence occurs.

Figure 15:
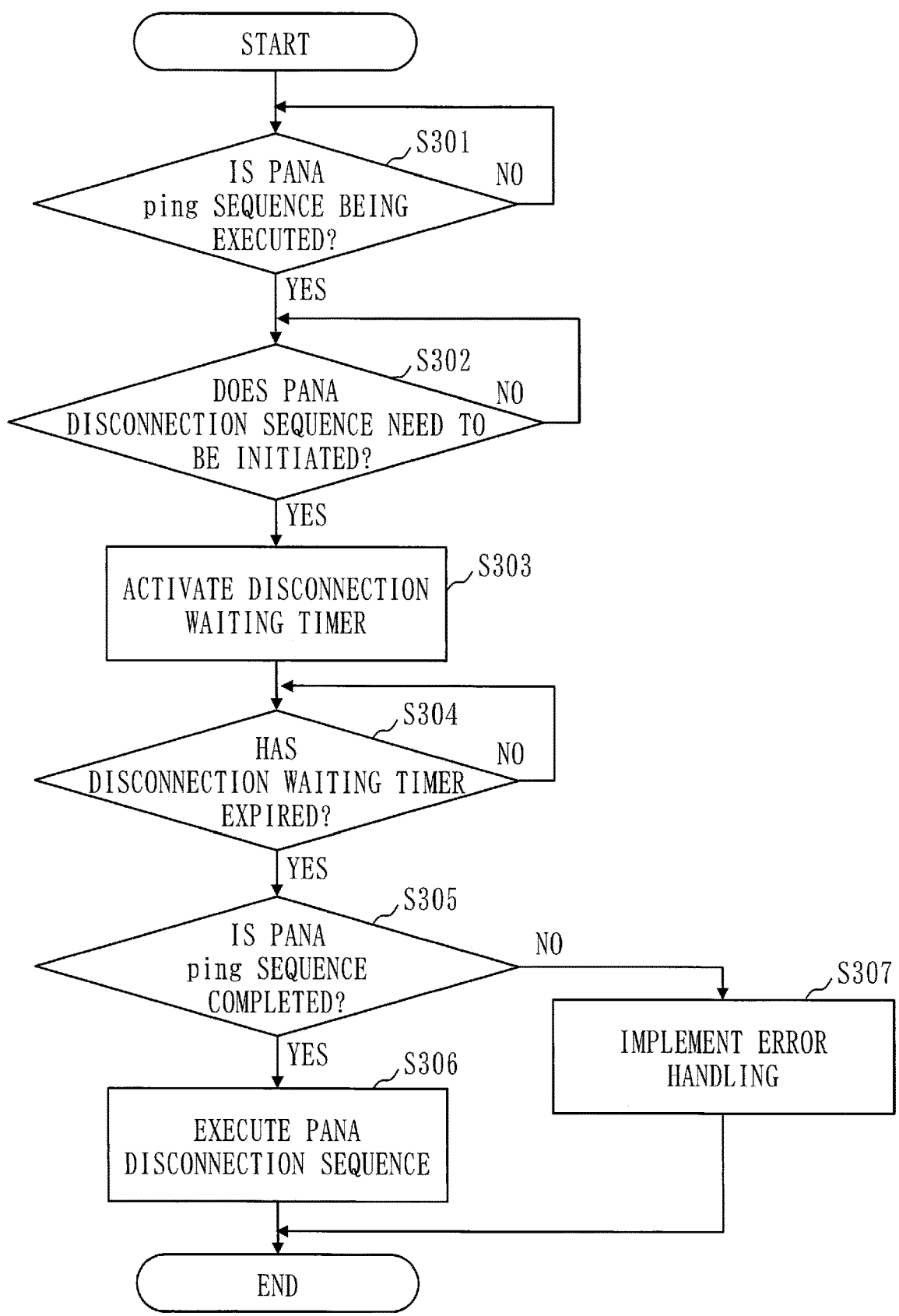
FIG. 15 is a flowchart illustrating an example of the operation of the second encrypted communication apparatus according to Embodiment 3.

FIG. 15 illustrates an example of the operation of the second encrypted communication apparatus 3 according to the present embodiment.

The timer management unit 14 determines whether the PANA ping sequence is currently being executed (step S301). In specific, if the timer management unit 14 is notified by the authentication control unit 13 of the PANA-Notification-Request 26 for the ping having been transmitted, the timer management unit 14 determines that the PANA ping sequence is currently being executed.

If the PANA ping sequence is currently being executed (YES in step S301), the timer management unit 14 determines whether the PANA disconnection sequence needs to be initiated. In specific, the timer management unit 14 determines whether the authentication control unit 13 has received the disconnection request 32 from the PANA control unit 10. If the authentication control unit 13 receives the disconnection request 32 from the PANA control unit 10, the authentication control unit 13 notifies the timer management unit 14 of the receipt of the disconnection request 32. If the timer management unit 14 determines that the PANA disconnection sequence needs to be initiated, the timer management unit 14 determines that the sequence contention event between the PANA ping sequence and the PANA disconnection sequence has occurred.

If the timer management unit 14 determines that the sequence contention event between the PANA ping sequence and the PANA disconnection sequence has occurred, the timer management unit 14 activates the disconnection waiting timer 17 (step S303).

Next, the timer management unit 14 determines whether the disconnection waiting timer 17 has expired (step S304).

If the disconnection waiting timer 17 has expired (YES in step S304), the timer management unit 14 determines whether the PANA ping sequence is completed (step S305).

If the timer management unit 14 is notified by the authentication control unit 13 of the PANA-Notification-Answer 29 having been received from the first encrypted communication apparatus 1, the timer management unit 14 determines that the PANA ping sequence is completed. If the timer management unit 14 determines that the PANA ping sequence is completed before the expiration of the disconnection waiting timer 17 (YES in step S305), the timer management unit 14 notifies the authentication control unit 13 that the PANA disconnection sequence may be initiated.

If the authentication control unit 13 is notified by the timer management unit 14 that the PANA disconnection sequence may be initiated, the authentication control unit 13 executes the PANA disconnection sequence (step S306). In specific, the authentication control unit 13 transmits the PANA-Termination-Request 33 for the PANA disconnection sequence.

On the other hand, if the timer management unit 14 determines that the PANA ping sequence is not completed before the expiration of the disconnection waiting timer 17 (NO in step S305), the timer management unit 14 notifies the authentication control unit 13 of the expiration of the disconnection waiting timer 17.

The authentication control unit 13 implements the prescribed error handling based on the notice from the timer management unit 14 (step S307).

According to the present embodiment, it is possible to efficiently proceed a process even if the event of the contention between the PANA ping sequence and the PANA disconnection sequence occurs.

Embodiments of the present invention are explained above. However, the embodiments may be implemented by combining two or more of the embodiments.

Or, any one of the embodiments may be implemented in part.

Or, a combination of any two or more of the embodiments may be implemented in part.

The present invention is not limited to the embodiments, but is changeable in various ways as necessary.

*Description of Hardware Configuration*

Finally, a supplementary explanation of a hardware configuration of the first encrypted communication apparatus 1 and the second encrypted communication apparatus 3 is described.

Each of the processor 911 illustrated in FIG. 16 and the processor 931 illustrated in FIG. 17 is an IC (Integrated Circuit) that implements processing.

Each of the processor 911 and the processor 931 is a CPU (Central Processing Unit), a DSP (Digital Signal Processor), and the like.

Each of the auxiliary storage device 912 and the auxiliary storage device 932 is a ROM (Read Only Memory), a flash memory, an HDD (Hard Disk Drive), and the like.

Each of the memory 913 and the memory 933 is a RAM (Random Access Memory).

Each of the communication interface 914 and the communication interface 934 is, for example, a communication chip or a NIC (Network Interface Card).

The auxiliary storage device 912 also stores an OS (Operating System).

And, at least a part of the OS is implemented by the processor 911.

The processor 911 implements a program to realize functions of the PANA authentication agent 2, the PANA control unit 5, the communication unit 6, the authentication control unit 8, and the timer management unit 9, implementing at least a part of the OS.

By the processor 911 implementing the OS, a task management, a memory management, a file management, a communication control, and the like, are carried out.

At least one of information, data, a signal value, and a variable value that indicates a process result of the PANA authentication agent 2, the PANA control unit 5, the communication unit 6, the authentication control unit 8, and the timer management unit 9 is stored in at least one of the auxiliary storage device 912, the memory 913, and a register and a cash memory of the processor 911.

The program to realize the functions of the PANA authentication agent 2, the PANA control unit 5, the communication unit 6, the authentication control unit 8, and the timer management unit 9 may be stored in a portable storage medium, such as a magnetic disk, a flexible disk, an optical disc, a compact disc, a Blu-ray (a registered trademark) disc, and a DVD.

The auxiliary storage device 932 also stores the OS.

And, at least a part of the OS is implemented by the processor 931.

The processor 931 implements a program to realize functions of the PANA authentication client 4, the PANA control unit 10, the communication unit 11, the authentication control unit 13, and the timer management unit 14, implementing at least a part of the OS.

By the processor 931 implementing the OS, the task management, the memory management, the file management, the communication control, and the like, are carried out.

At least one of the information, the data, the signal value, and the variable value that indicates a process result of the PANA authentication client 4, the PANA control unit 10, the communication unit 11, the authentication control unit 13, and the timer management unit 14 is stored in at least one of the auxiliary storage device 932, the memory 933, and a register and a cash memory of the processor 931.

The program to realize the functions of the PANA authentication client 4, the PANA control unit 10, the communication unit 11, the authentication control unit 13, and the timer management unit 14 may be stored in the portable storage medium, such as the magnetic disk, the flexible disk, the optical disc, the compact disc, the Blu-ray (a registered trademark) disc, and the DVD.

A "unit" of the PANA control unit 5, the communication unit 6, the authentication control unit 8, the timer management unit 9, the PANA control unit 10, the communication unit 11, the authentication control unit 13, and the timer management unit 14 may be replaced by a "circuit", a "step", a "procedure", or a "process".

Each of the first encrypted communication apparatus 1 and the second encrypted communication apparatus 3 may be realized by a processing circuit. The processing circuit is, for example, a logic IC (Integrated Circuit), a GA (Gate Array), an ASIC (Application Specific Integrated Circuit), and an FPGA (Field-Programmable Gate Array).

In this description, a broader concept of a processor, a memory, a combination of the processor and the memory, and the processing circuit is called as "processing circuitry".

In other words, each of the processor, the memory, the combination of the processor and the memory, and the processing circuit is an example of the "processing circuitry".

REFERENCE SIGNS LIST

1: first encrypted communication apparatus; 2: PANA authentication agent; 3: second encrypted communication apparatus; 4: PANA authentication client; 5: PANA control unit; 6: communication unit; 7: PANA authentication agent; 8: authentication control unit; 9: timer management unit; 10: PANA control unit; 11: communication unit; 12: PANA authentication client; 13: authentication control unit; 14: timer management unit; 15: authentication phase termination timer; 16: re-authentication waiting timer; 17: disconnection waiting timer; 100: first encrypted communication apparatus; 300: second encrypted communication apparatus.

The invention claimed is:

1. A communication apparatus operating as a PANA (Protocol for Carrying Authentication for Network Access) authentication client, the communication apparatus comprising:
   processing circuitry to
   if any of a plurality of events associated with PANA authentication occurs, activate a timer among a plurality of timers that corresponds to the event that has occurred, and
   when the timer activated expires, refer to management information which describes an operation procedure to be taken at timer expiration for each of the plurality of events, and to execute the operation procedure described in the management information regarding the event that has occurred,
   wherein the management information describes a PANA authentication initiation event as one of the plurality of events, by which a PANA authentication sequence is initiated, the PANA authentication sequence being a communication sequence for the PANA authentication, and an operation procedure, as an operation procedure to be taken when the timer activated by the occurrence of the PANA authentication initiation event expires, that authentication information used for the PANA authentication sequence is discarded and a status of the communication apparatus is restored to an IDLE status,
   wherein the processing circuitry, when the PANA authentication sequence is initiated with a communication destination device operating as a PANA authentication agent, determines that the PANA authentication initiation event has occurred, and activates the timer that corresponds to the PANA authentication initiation event, and
   wherein the processing circuitry, when the timer that corresponds to the PANA authentication initiation event expires, discards the information used for the PANA authentication sequence, and restores the status of the communication apparatus to the IDLE status.

2. The communication apparatus according to claim 1, wherein the management information describes the operation procedure, as an operation procedure to be taken when the timer activated by the occurrence of the PANA authentication initiation event expires because the PANA authentication sequence fails to be completed properly, that the information used for the PANA authentication sequence is discarded and the status of the communication apparatus is restored to the IDLE status;

wherein the processing circuitry, if the PANA authentication sequence is completed properly before the expiration of the timer that corresponds to the PANA authentication initiation event, stops the timer that corresponds to the PANA authentication event; and wherein the processing circuitry, when the timer that corresponds to the PANA authentication initiation event expires because the PANA authentication sequence fails to be completed properly, discards the information used for the PANA authentication sequence, and restores the status of the communication apparatus to the IDLE status.

3. A communication apparatus operating as a PANA (Protocol for Carrying Authentication for Network Access) authentication client, the communication apparatus comprising:

processing circuitry to if any of a plurality of events associated with PANA authentication occurs, activate a timer among a plurality of timers that corresponds to the event that has occurred, and when the timer activated expires, refer to management information which describes an operation procedure to be taken at timer expiration for each of the plurality of events, and to execute the operation procedure described in the management information regarding the event that has occurred, wherein the management information describes, as one of the plurality of events, a sequence contention event that is an event by which a second communication sequence is requested to be initiated before a first communication sequence is completed, the second communication sequence being different from the first communication sequence, and as an operation procedure to be taken when the timer activated by the occurrence of the sequence contention event expires, an operation procedure that the second communication sequence is initiated if the first communication sequence has been completed when the timer expires, wherein the processing circuitry, if the first communication sequence is initiated with the communication destination device operating as the PANA authentication agent and the second communication sequence is requested to be initiated before the first communication sequence is completed, determines that the sequence contention event has occurred, and activates the timer that corresponds to the sequence contention event, and wherein the processing circuitry, when the timer that corresponds to the sequence contention event expires, determines whether the first communication sequence has been completed with the communication destination device, and, if the first communication sequence has been completed, initiates the second communication sequence with the communication destination device.

4. The communication apparatus according to claim 3, wherein the management information describes, as the first communication sequence, a PANA ping sequence that is a ping communication sequence to maintain a PANA session, as the second communication sequence, a PANA re-authentication sequence that is a communication sequence for PANA re-authentication, as the sequence contention event, an event by which the PANA re-authentication sequence is requested to be initiated before the PANA ping sequence is completed, and, as an operation procedure to be taken when the timer activated by the occurrence of the sequence contention event expires, an operation procedure that the PANA re-authentication sequence is initiated if the PANA ping sequence has been completed when the timer expires;

wherein the processing circuitry, if the PANA ping sequence is initiated with the communication destination device and the PANA re-authentication sequence is requested to be initiated before the PANA ping sequence is completed, determines that the sequence contention event has occurred, and activates the timer that corresponds to the sequence contention event; and wherein the processing circuitry, when the timer that corresponds to the sequence contention event expires, determines whether the PANA ping sequence has been completed with the communication destination device, and, if the PANA ping sequence has been completed, initiates the PANA re-authentication sequence with the communication destination device.

5. The communication apparatus according to claim 3, wherein the management information describes, as the first communication sequence, a PANA ping sequence that is a ping communication sequence to maintain a PANA session, as the second communication sequence, a PANA disconnection sequence that is a communication sequence to disconnect the PANA session, as the sequence contention event, an event by which the PANA disconnection sequence is requested to be initiated before the PANA ping sequence is completed, and as an operation procedure to be taken when the timer activated by the occurrence of the sequence contention event expires, an operation procedure that the PANA disconnection sequence is initiated if the PANA ping sequence has been completed when the timer expires;

wherein the processing circuitry, if the PANA ping sequence is initiated with the communication destination device and the PANA disconnection sequence is requested to be initiated before the PANA ping sequence is completed, determines that the sequence contention event has occurred, and activates the timer that corresponds to the sequence contention event; and wherein the processing circuitry, when the timer that corresponds to the sequence contention event expires, determines whether the PANA ping sequence is completed with the communication destination device, and, if the PANA ping sequence has been completed, initiates the PANA disconnection sequence with the communication destination device.

6. An operation procedure management method comprising:

a timer management process of activating, if any of a plurality of events associated with PANA authentication occurs, a timer among a plurality of timers that corresponds to the event that has occurred, by a communication apparatus operating as a PANA (Protocol for Carrying Authentication for Network Access) authentication client, and an operation procedure execution process of referring to, when the activated timer expires, management information which describes an operation procedure to be taken at timer expiration for each of the plurality of events, and executing the operation procedure described in the management information regarding the event that has occurred, by the communication apparatus, wherein the management information describes a PANA authentication initiation event as one of the plurality of events, by which a PANA authentication sequence is initiated, the PANA authentication sequence being a communication sequence for the PANA authentication, and an operation procedure, as an operation procedure to be taken when the timer activated by the occurrence of the PANA authentication initiation event expires, that authentication information used for the PANA authentication sequence is discarded and a status of the communication apparatus is restored to an IDLE status, wherein, in the timer management process, when the PANA authentication sequence is initiated with a communication destination device operating as a PANA authentication agent, the communication apparatus determines that the PANA authentication initiation event has occurred, and activates the timer that corresponds to the PANA authentication initiation event, and wherein, in the operation procedure execution process, when the timer that corresponds to the PANA authentication initiation event expires, the communication apparatus discards the information used for the PANA authentication sequence, and restores the status of the communication apparatus to the IDLE status.

7. An operation procedure management method comprising:

a timer management process of activating, if any of a plurality of events associated with PANA authentication occurs, a timer among a plurality of timers that corresponds to the event that has occurred, by a communication apparatus operating as a PANA (Protocol for Carrying Authentication for Network Access) authentication client, and an operation procedure execution process of referring to, when the activated timer expires, management information which describes an operation procedure to be taken at timer expiration for each of the plurality of events, and executing the operation procedure described in the management information regarding the event that has occurred, by the communication apparatus, wherein the management information describes, as one of the plurality of events, a sequence contention event that is an event by which a second communication sequence is requested to be initiated before a first communication sequence is completed, the second communication sequence being different from the first communication sequence, and as an operation procedure to be taken when the timer activated by the occurrence of the sequence contention event expires, an operation procedure that the second communication sequence is initiated if the first communication sequence has been completed when the timer expires, wherein, in the timer management process, if the first communication sequence is initiated with the communication destination device operating as the PANA authentication agent and the second communication sequence is requested to be initiated before the first communication sequence is completed, the communication apparatus determines that the sequence contention event has occurred, and activates the timer that corresponds to the sequence contention event, and wherein, in the operation procedure execution process, when the timer that corresponds to the sequence contention event expires, the communication apparatus determines whether the first communication sequence has been completed with the communication destination device, and, if the first communication sequence has been completed, initiates the second communication sequence with the communication destination device.

8. A non-transitory computer readable medium storing an operation procedure management program which causes a communication apparatus operating as a PANA (Protocol for Carrying Authentication for Network Access) authentication client to execute:

a timer management process, if any of a plurality of events associated with PANA authentication occurs, of activating a timer among a plurality of timers that corresponds to the event that has occurred, and an operation procedure execution process, when the timer activated by the timer management process expires, of referring to management information which describes an operation procedure to be taken at timer expiration for each of the plurality of events and, executing the operation procedure described in the management information regarding the event that has occurred, wherein the management information describes a PANA authentication initiation event as one of the plurality of events, by which a PANA authentication sequence is initiated, the PANA authentication sequence being a communication sequence for the PANA authentication, and an operation procedure, as an operation procedure to be taken when the timer activated by the occurrence of the PANA authentication initiation event expires, that authentication information used for the PANA authentication sequence is discarded and a status of the communication apparatus is restored to an IDLE status, wherein, in the timer management process, when the PANA authentication sequence is initiated with a communication destination device operating as a PANA authentication agent, the communication apparatus is caused to determine that the PANA authentication initiation event has occurred, and activate the timer that corresponds to the PANA authentication initiation event, and wherein, in the operation procedure execution process, when the timer that corresponds to the PANA authentication initiation event expires, the communication apparatus is caused to discard the information used for the PANA authentication sequence, and restore the status of the communication apparatus to the IDLE status.

9. A non-transitory computer readable medium storing an operation procedure management program which causes a communication apparatus operating as a PANA (Protocol for Carrying Authentication for Network Access) authentication client to execute:

a timer management process, if any of a plurality of events associated with PANA authentication occurs, of activating a timer among a plurality of timers that corresponds to the event that has occurred, and an operation procedure execution process, when the timer activated by the timer management process expires, of referring to management information which describes an operation procedure to be taken at timer expiration for each of the plurality of events and, executing the operation procedure described in the management information regarding the event that has occurred, wherein the management information describes, as one of the plurality of events, a sequence contention event that is an event by which a second communication sequence is requested to be initiated before a first communication sequence is completed, the second communication sequence being different from the first communication sequence, and as an operation procedure to be taken when the timer activated by the occurrence of the sequence contention event expires, an operation procedure that the second communication sequence is initiated if the first communication sequence has been completed when the timer expires, wherein, in the timer management process, if the first communication sequence is initiated with the communication destination device operating as the PANA authentication agent and the second communication sequence is requested to be initiated before the first communication sequence is completed, the communication apparatus is caused to determine that the sequence contention event has occurred, and activate the timer that corresponds to the sequence contention event, and wherein, in the operation procedure execution process, when the timer that corresponds to the sequence contention event expires, the communication apparatus is caused to determine whether the first communication sequence has been completed with the communication destination device, and, if the first communication sequence has been completed, initiate the second communication sequence with the communication destination device.

* * * * *